United States Patent
Tsukahara et al.

(10) Patent No.: US 6,504,802 B1
(45) Date of Patent: Jan. 7, 2003

(54) TRACKING CONTROL METHOD AND STORAGE UNIT

(75) Inventors: Wataru Tsukahara, Kawasaki (JP); Shigenori Yanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/349,029

(22) Filed: Jul. 7, 1999

(30) Foreign Application Priority Data

Dec. 17, 1998 (JP) .......................... 10-359435

(51) Int. Cl.$^7$ .................................. G11B 7/00
(52) U.S. Cl. .................. 369/44.35; 369/53.28; 369/44.34
(58) Field of Search ................. 369/44.29, 44.35, 369/44.31, 116, 53.26, 53.27, 53.28, 53.35, 44.32, 44.34

(56) References Cited

U.S. PATENT DOCUMENTS

| | | | |
|---|---|---|---|
| 4,731,771 A | * 3/1988 | Maeda et al. ............. | 369/44.25 |
| 4,866,688 A | * 9/1989 | Ohtake et al. ............ | 369/44.28 |
| 4,977,551 A | 12/1990 | Minami et al. ........... | 369/44.25 |
| 5,026,981 A | * 6/1991 | Yamane et al. ........... | 369/44.29 |
| 5,109,367 A | 4/1992 | Yoshikawa ............... | 369/44.25 |
| 5,517,475 A | 5/1996 | Koyama et al. .......... | 369/44.32 |
| 5,553,040 A | * 9/1996 | Hanano et al. ........... | 369/53.28 |

FOREIGN PATENT DOCUMENTS

| | | |
|---|---|---|
| EP | 282 288 | 9/1988 |
| EP | 453 308 | 10/1991 |
| JP | 62141644 | 6/1987 |
| JP | 2166633 | 6/1990 |
| JP | 380478 | 4/1991 |
| JP | 6012692 | 1/1994 |
| JP | 9007195 | 1/1997 |

\* cited by examiner

Primary Examiner—Thang V. Tran
(74) Attorney, Agent, or Firm—Greer, Burns & Crain, Ltd.

(57) ABSTRACT

A tracking control method carries out a tracking control based on a tracking error signal which indicates an error of a beam spot formed on a recording medium by a light beam from a light source with respect to a track. The tracking control method includes detecting a change in a light emission power of the light source, calculating a correction quantity which is used to correct a shift and/or fluctuation of the tracking error signal generated due to the change in the light emission power, and carrying out a correction by adding the correction quantity to the tracking error signal when the change in the light emission power is detected.

24 Claims, 46 Drawing Sheets

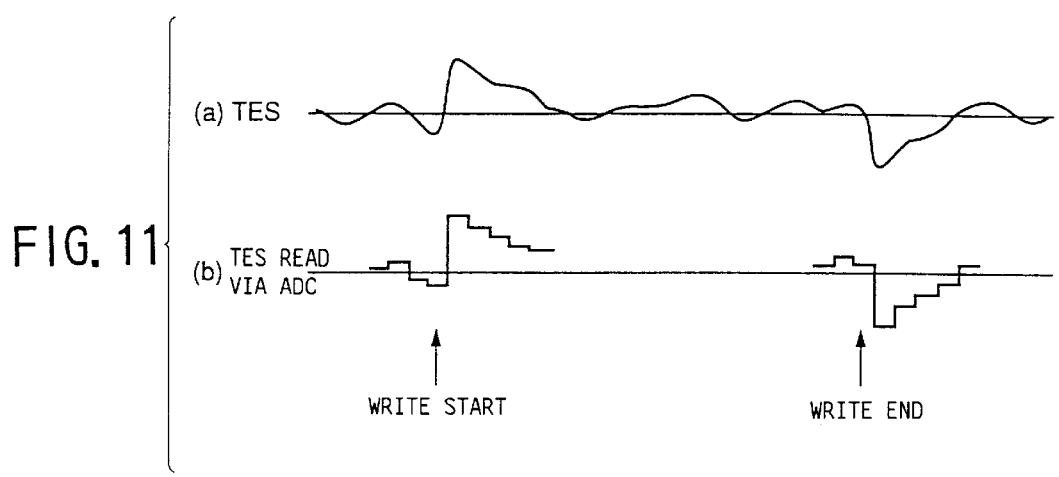
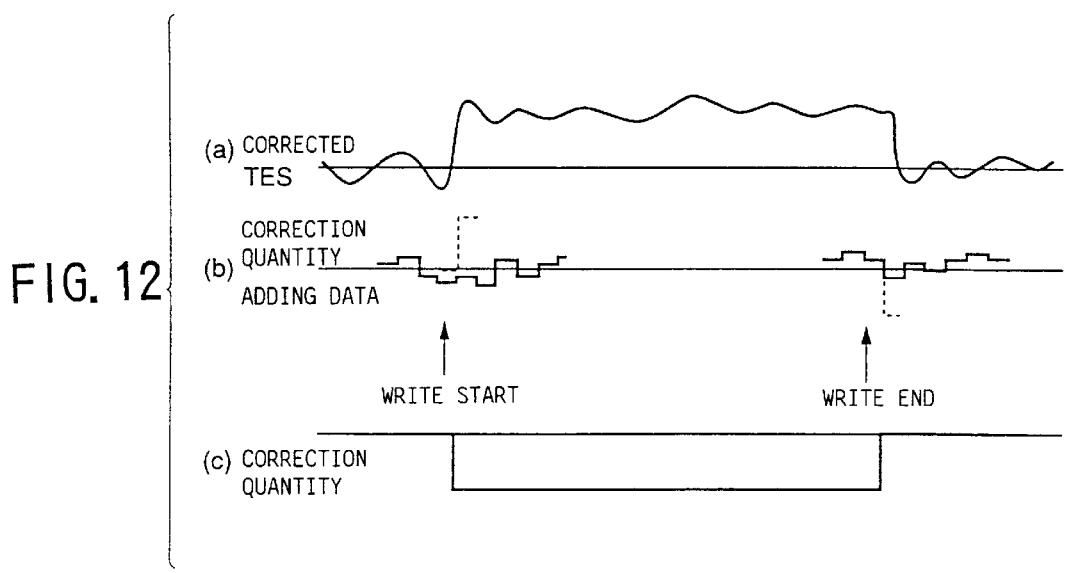

(a) TES (b) WG

↑
CORRECTION QUANTITY
CALCULATING TIMING

TRACKING CONTROL METHOD AND STORAGE UNIT

BACKGROUND OF THE INVENTION

1. Field of the Invention

The present invention generally relates to tracking control methods and storage units, and more particularly to a tracking control method which carries out a tracking control by following a change in a light emission power of a light source and to a storage unit such as an optical disk unit which employs such a tracking control method.

2. Description of the Related Art

In optical disk units which record and/or reproduce information with respect to an optical disk such as a magneto-optical disk, a tracking control is carried out so that a light beam spot scans a desired track on the optical disk. The tracking control is sometimes also referred to as a track servo. Normally, the tracking control is carried out based on a tracking error signal (TES) which is obtained by a known method and indicates an error of the light beam spot from the desired track.

When a write/erase process is carried out during the tracking control and a light emission power of a light source increases, a wavelength of the light beam emitted from the light source becomes long, thereby generating a "TES shift" and a "TES fluctuation" as will be described later.

A beam splitter always exists in an optical system of the optical disk unit. The beam splitter transmits the light beam from the light source and supplies the light beam to the optical disk via an objective lens, and supplies the light beam reflected from the optical disk to a light detection system. In a case of an optical disk unit having a construction such that the light beam from the light source is incident at an angle with respect to a beam splitter 1 as shown in FIG. 1, a refractive index of the beam splitter 1 changes when the wavelength of the light beam changes. Hence, in this case, a deviation is introduced in an optical axis of the light beam transmitted through the beam splitter 1. If a cross section of the light beam from the light source has an oval shape, the light beam is input to the beam splitter 1 at an incident angle so as to correct the cross section to a true circular shape. When the optical axis deviates as described above, an irradiated position of the optical beam on a photodetector of the light detection system also deviates from a normal position, thereby generating an offset in the TES. As a result, the TES shifts, and the "TES shift" described above is generated.

In FIG. 1, the following relationship stands, where θ1 denotes an incident angle of the light beam from the light source to the beam splitter 1, θ2 denotes an angle formed by a normal with respect to an incident surface of a block 1A of the beam splitter 1 and the light beam propagating within the block 1A, θ3 denotes an incident angle of the light beam from the block 1A to a block 1B of the beam splitter 1, θ4 denotes an angle formed by a normal with respect to an incident surface of the block 1B and the light beam propagating within the block 1B, θ5 denotes an angle formed by the light beam propagating within the block 1B and a normal with respect to a light output surface of the block 1B, θ6 denotes an output angle of the light beam from the beam splitter 1 to an objective lens, ηair denotes a refractive index of air, ηA denotes a refractive index of the block 1A, and ηB denotes a refractive index of the block 1B.

$$\eta air \cdot \sin\theta 1 = \eta A \cdot \sin\theta 2$$
$$\eta A \cdot \sin\theta 3 = \eta B \cdot \sin\theta 4$$
$$\eta B \cdot \sin\theta 5 = \eta air \cdot \sin\theta 6$$

In this case, the incident angle θ1 will not change. But since the refractive indexes ηA and ηB of the blocks 1A and 1B change when the wavelength of the light beam changes, the output angle θ6 is affected by the change in the wavelength.

On the other hand, in the optical disk unit, a focus control is carried out to control a focus position of the light beam, by controlling the objective lens so as to form the light beam spot on the optical disk. As shown in FIG. 2, in an optimum focus state, an objective lens 2 is controlled so that the light beam converges at an optimum focus position on an optical disk 3. However, when the wavelength of the light beam becomes long as described above, a focal distance of the objective lens 2 also becomes long as shown in FIG. 3. As a result, the light beam in this case no longer converges at the optimum focus position on the optical disk 3, and it takes time to converge the light beam at the optimum focus position on the optical disk 3 by controlling the objective lens 2. For this reason, the TES becomes unstable during the time it takes to converge the light beam at the optimum focus position by controlling the objective lens 2, and the "TES fluctuation" described above is generated.

When the TES shift and/or the TES fluctuation described above is generated, a control is activated in an opposite direction so as to suppress the TES shift and/or the TES fluctuation, and as a result, unnecessary control and vibration are generated in servo systems. Particularly in a track servo system, there was a problem in that the write performance deteriorates when the TES fluctuation is generated during the write/erase process. In addition, when the TES shift is generated, the light beam scans a position deviated from a center of the track, and not the center of the track, and there was a problem in that the write performance also deteriorates from this point of view. Furthermore, when the vibration of the servo systems is large, an off-track detection sensitivity becomes excessively sensitive, and there was a problem in that the write performance also deteriorates from this point of view.

SUMMARY OF THE INVENTION

Accordingly, it is a general object of the present invention to provide a novel and useful tracking control method and a storage unit, in which the problems described above are eliminated.

Another and more specific object of the present invention is to provide a tracking control method and a storage unit, which suppress effects of instability factors of the track servo system generated when the light emission power of the light source changes, that is, the effects of the TES shift, the TES fluctuation and the like, so as to stabilize the servo systems and to improve the write performance.

Still another object of the present invention is to provide a tracking control method for carrying out a tracking control based on a tracking error signal which indicates an error of a beam spot formed on a recording medium by a light beam from a light source with respect to a track, comprising a detecting step detecting a change in a light emission power of the light source, a calculating step calculating a correction quantity which is used to correct a shift and/or fluctuation of the tracking error signal generated due to the change in the light emission power, and a correcting step carrying out a correction by adding the correction quantity to the tracking error signal when the change in the light emission power is detected by the detecting step. According to the tracking control method of the present invention, it is possible to realize a tracking control method and a storage unit, which suppress effects of instability factors of the track servo system generated when the light emission power of the light source changes, that is, the effects of the TES shift, the TES fluctuation and the like, so as to stabilize the servo systems and to improve the write performance.

A further object of the present invention is to provide a storage unit comprising a light source emitting a light beam, a tracking control section carrying out a tracking control based on a tracking control based on a tracking error signal which indicates an error of a beam spot formed on a recording medium by the light beam with respect to a track, a detecting section detecting a change in a light emission power of the light source, a calculating section calculating a correction quantity which is used to correct a shift and/or fluctuation of the tracking error signal generated due to the change in the light emission power, and a correcting section carrying out a correction by adding the correction quantity to the tracking error signal when the change in the light emission power is detected by the detecting section. According to the storage unit of the present invention, it is possible to realize a tracking control method and a storage unit, which suppress effects of instability factors of the track servo system generated when the light emission power of the light source changes, that is, the effects of the TES shift, the TES fluctuation and the like, so as to stabilize the servo systems and to improve the write performance.

Other objects and further features of the present invention will be apparent from the following detailed description when read in conjunction with the accompanying drawings.

BRIEF DESCRIPTION OF THE DRAWINGS

FIG. 11 is a diagram for explaining a case where no correction of a TES is made depending on a change in a light emission power;

FIG. 12 is a diagram for explaining a case where the correction of the TES is made depending on the change in the light emission power by the first embodiment of the tracking control method;

DESCRIPTION OF THE PREFERRED EMBODIMENTS

A description will be given of embodiments of the present invention, by referring to FIG. 4 and the subsequent drawings.

First, a description will be given of an embodiment of a storage unit according to the present invention. FIG. 4 is a system block diagram showing the general construction of this embodiment of the storage unit. In this embodiment, the present invention is applied to an optical disk unit. This embodiment of the storage unit may employ each of embodiments of a tracking correction method according to the present invention.

Figure 1:
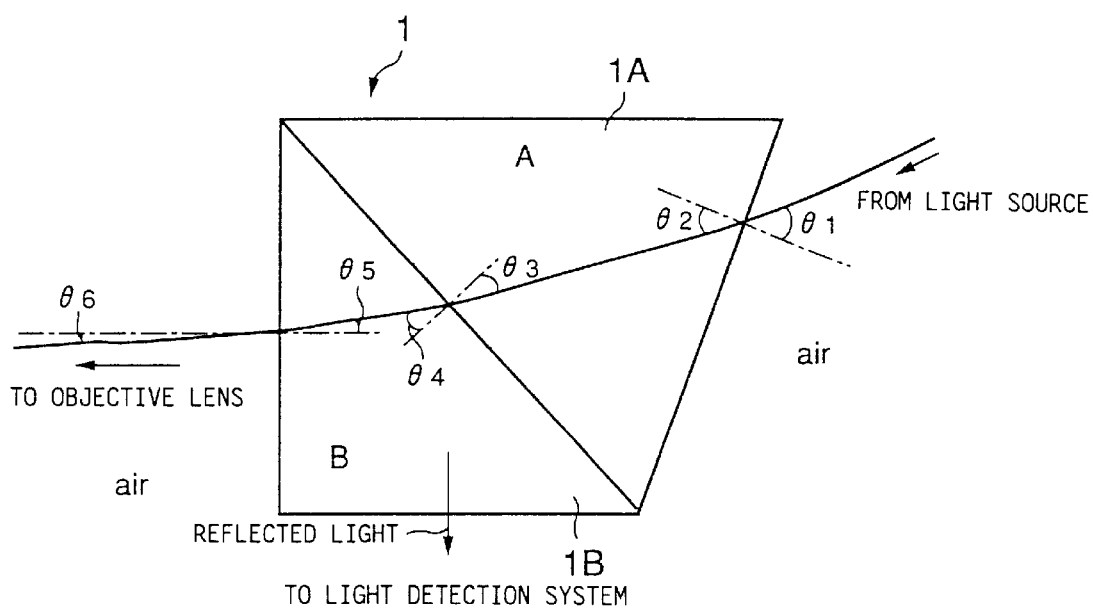
FIG. 1 is a diagram for explaining a beam splitter of a conventional optical system.
Figure 2:
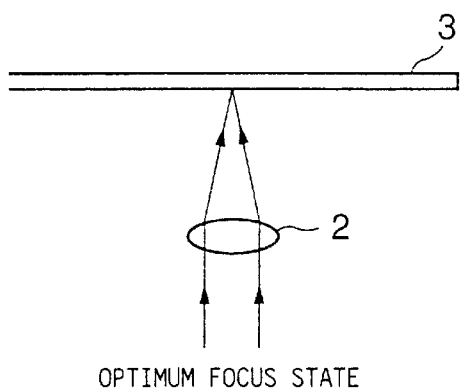
FIG. 2 is a diagram for explaining an optimum focus state of an objective lens.
Figure 3:
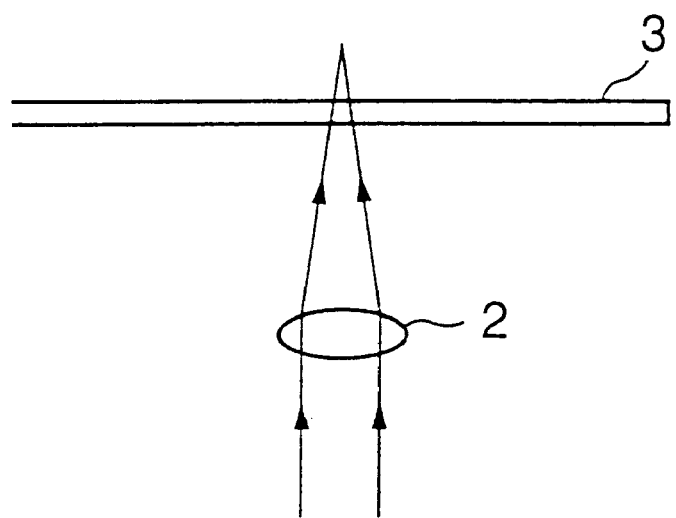
FIG. 3 is a diagram for explaining a change in a focal distance of the objective lens.
Figure 4:
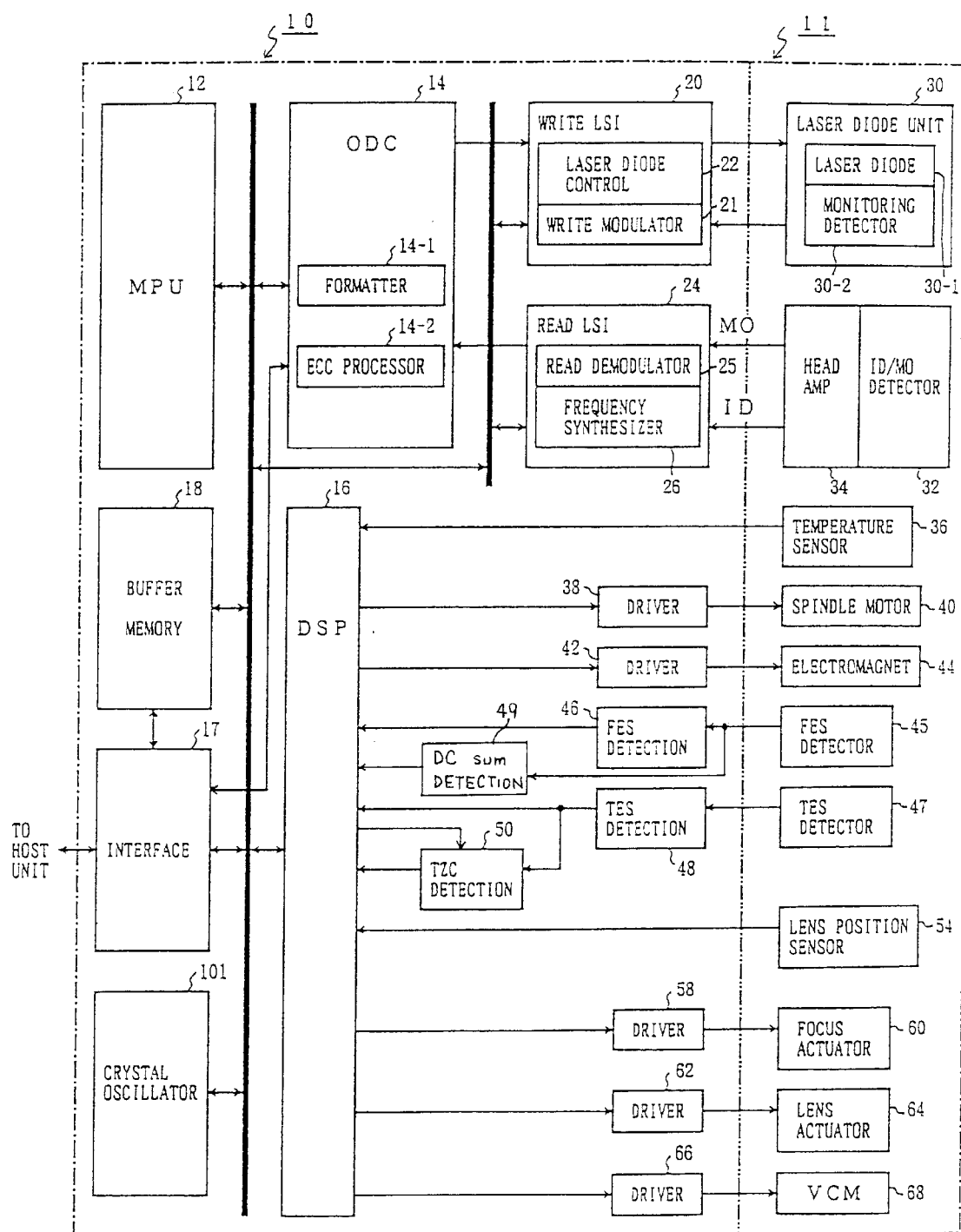
FIG. 4 is a system block diagram showing the general construction of an embodiment of a storage unit according to the present invention.

As shown in FIG. 4, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read/write data with respect to an optical disk (not shown), a digital signal processor (DSP) 16, and a buffer memory 18. The buffer memory 18 is used in common by the MPU 12, the ODC 14 and the interface 17, and includes a dynamic random access memory (DRAM), for example. A crystal oscillator 101 which is used to generate clocks is coupled to the MPU 12.

The ODC 14 includes a formatter 14-1 and error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 14-2. Further, the NRZ data in sector units are connected in the formatter 14-1 so as to transfer a NRZ read data stream to the host unit.

A write large scale integrated (LSI) circuit 20 is provided with respect to the ODC 14. This write LSI circuit 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk using the laser diode unit 30, this embodiment can use any one of writable magneto-optical (MO) cartridge mediums having the storage capacities of 128 MB, 230 MB, 540 MB, 640 MB and 1.3 GB. In the MO cartridge medium having the storage capacity of 128 MB, the PPM recording is employed to record the data in correspondence with the existence and non-existence of marks on the optical disk. In addition, a constant angular velocity (CAV) is used as the recording format of the optical disk having the storage capacity of 128 MB, and a zone constant angular velocity (ZCAV) is used as the recording format of the optical disk having the storage capacity of 230 MB, where 1 zone is provided as a user region in the case of the optical disk having the storage capacity of 128 MB and 10 zones are provided as the user region in the case of the optical disk having the storage capacity of 230 MB.

In the MO cartridge mediums having the storage capacities of 540 MB and 640 MB and used for the high-density recording, the PWM recording is employed to record the data in correspondence with the edges of the marks, that is, leading and trailing edges, on the optical disk. The difference between the storage capacities of the optical disk having the storage capacity of 540 MB and the optical disk having the storage capacity of 640 MB is due to the different sector capacities. The optical disk has the storage capacity of 540 MB if the sector capacity is 512 bytes, and the optical disk has the storage capacity of 640 MB if the sector capacity is 2048 bytes. In addition, the zone CAV is used as the recording format of the optical disk, where 18 zones are provided as the user region in the case of the optical disk having the storage capacity of 540 MB and 11 zones are provided as the user region in the case of the optical disk having the storage capacity of 640 MB.

Hence, this embodiment can cope with the optical disks having the storage capacities of 128 MB, 230 MB, 540 MB, 640 MB and 1.3 GB, and also cope with direct overwrite type optical disks having the storage capacities of 230 MB, 540 MB, 640 MB and 1.3 GB. Accordingly, when the optical disk is loaded into the optical disk unit, an identification (ID) part of the optical disk is first read so as to recognize the type of the optical disk by the MPU 12 from the intervals of the pits, and a recognition result of the type of loaded optical disk is notified to the ODC 14.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects a laser beam emitted from the laser diode 30-1 and returned via the optical disk, and a detection signal from this ID/MO detector 32 is input as an ID signal and a MO signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and read data from the input ID signal and MO signal, and demodulates the PPM data or the PWM data back into the original NRZ data. In addition, since the zone CAV is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked loop (PLL) circuit having a programmable frequency divider, and generates as a read clock a reference clock having a predetermined specific frequency depending on the zone position on the optical disk. In other words, the frequency synthesizer 26 is formed by the PLL circuit having the programmable frequency divider, and generates the reference clock having a frequency fo based on fo=(m/n)·fi according to a frequency dividing ratio m/n which is set by the MPU 12 depending on a zone number.

A denominator n of the frequency dividing ratio m/n is a specific value depending on the type of optical disk having the storage capacity of 128 MB, 230 MB, 540 MB, 640 MB or 1.3 GB. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a reference clock frequency generated outside the frequency synthesizer 26.

The read data demodulated in the read LSI circuit 24 is supplied to the read system of the ODC 14, and after carrying out the reverse conversion of the 1–7 RLL, the CRC and the ECC processes are carried out by the encoding function of the ECC processor 14-2 so as to restore the original NRZ data. Next, the formatter 14-1 connects and converts the NRZ sector data into the NRZ read data stream, and this NRZ read data stream is transferred to the host unit via the buffer memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the zone CAV is employed as the recording format of the optical disk, the spindle motor 40 is rotated at a constant speed of 3000 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is provided in the optical unit of the enclosure 11 so as to detect the laser beam emitted from the laser diode 30-1 and returned via the optical disk. A FES detection circuit 46 generates a FES from a detection signal received from the FES detector 45, and inputs this FES to the DSP 16.

In addition, a DC sum detection circuit 49 generates a DC sum signal which will be described later from the detection signal received from the FES detector 45, and inputs the DC sum signal to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES from a detection signal received from the TES detector 47, and inputs this TES to the DSP 16. The TES is also input to a track zero-crossing (TZC) detection circuit 50, and this TZC detection circuit 50 generates TZC pulses which are input to the DSP 16.

A lens position sensor 52 is provided in the enclosure 11. This lens position sensor 52 detects a position of an objective lens through which the laser beam is irradiated on the optical disk. A lens position detection signal (LPOS) from the lens position sensor 52 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 5:
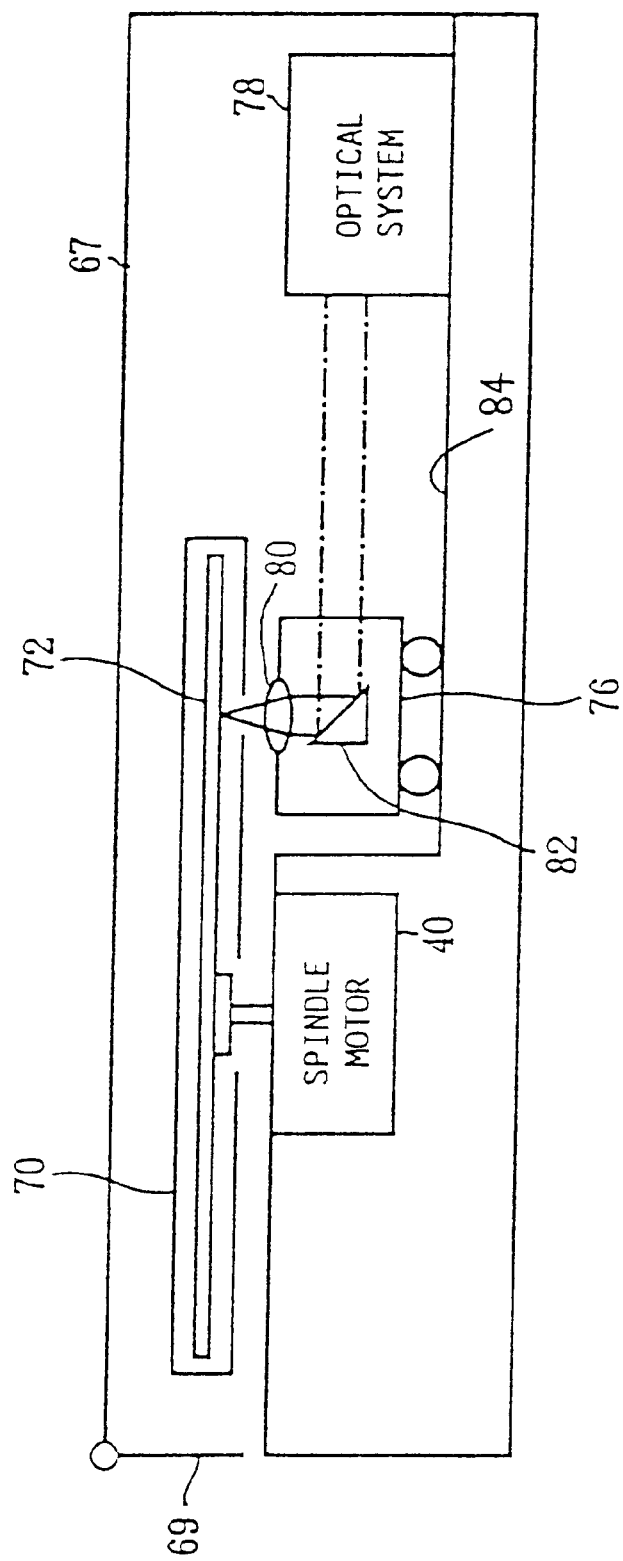
FIG. 5 is a cross sectional view showing the general construction of an enclosure.

FIG. 5 is a cross sectional view showing the general construction of the enclosure 11. As shown in FIG. 5, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk 72 with respect to the optical disk unit.

A carriage 76 is provided below the optical disk 72 within the loaded MO cartridge 70. This carriage 76 is freely movable, under guidance of a guide rail 84, in a direction which traverses tracks on the optical disk 72 when driven by the VCM 68. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure 11 shown in FIG. 4. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 4. The lens position sensor 54 outputs the lens position detection signal which takes a value zero at a neutral position where the optical axis of the objective lens 80 is perpendicular to the recording surface of the optical disk 72, and has a magnitude and a polarity depending on the amount of the optical axis of the objective lens 80 moved towards the inner or outer peripheral side of the optical disk 72.

Figure 6:
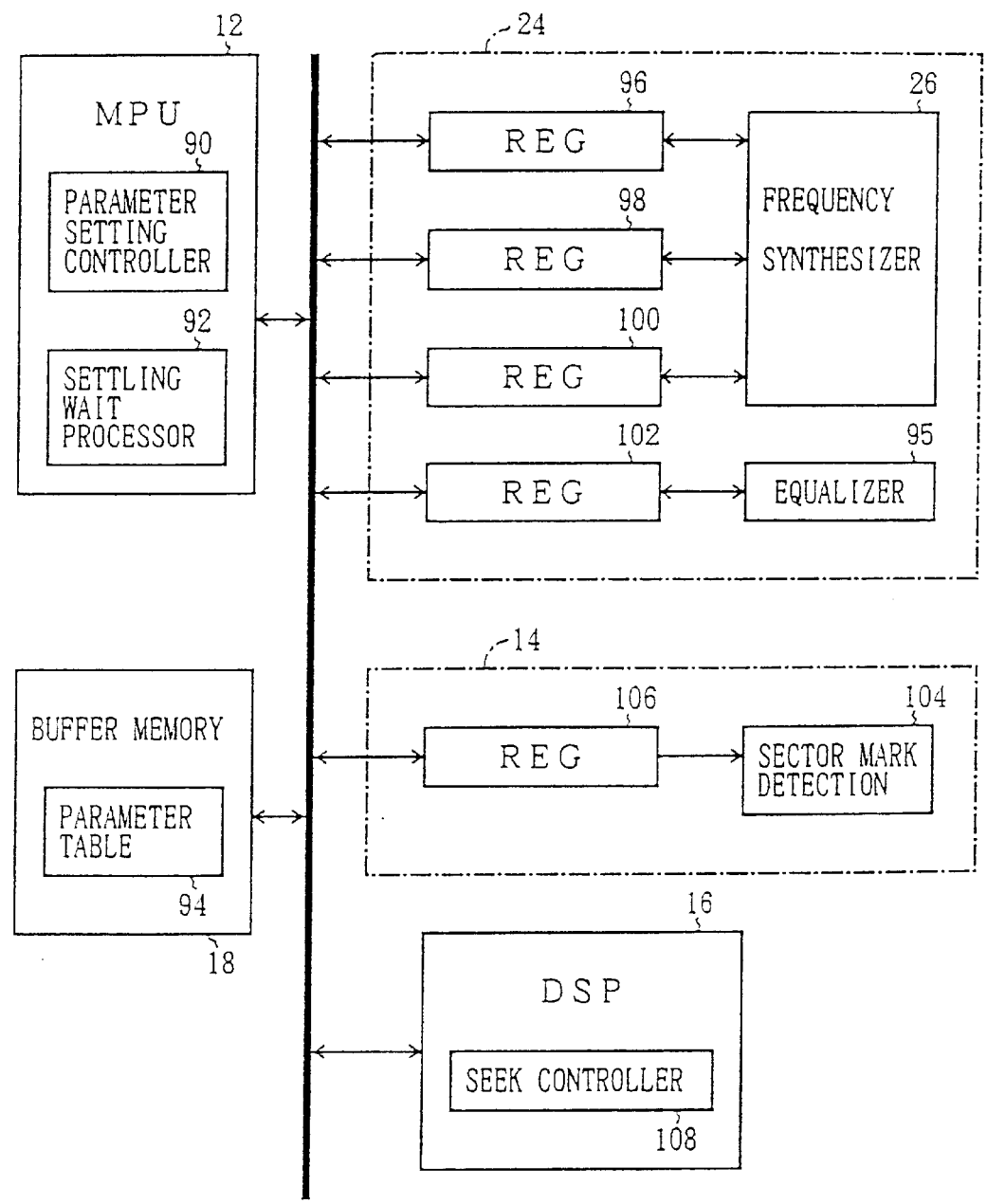
FIG. 6 is a system block diagram for explaining parameter setting control and settling wait functions with respect to a read LSI circuit, an ODC and a DSP of a MPU in an optical disk unit.

FIG. 6 is a system block diagram for explaining the parameter setting control and settling wait functions of the MPU 12 of the optical disk unit shown in FIG. 4 with respect to the read LSI circuit 24, the ODC 14 and the DSP 16.

The MPU 12 includes a parameter setting controller 90 which operates based on a read command from the host unit, and a settling wait processor 92 for waiting the settling after the parameter setting. The parameter setting controller 90 controls the setting of the parameters which are required to make various kinds of accesses by use of a parameter table 94 which is developed in a RAM or the like included in the buffer memory 18.

Elements the parameters of which are to be set by the parameter setting controller 90 of the MPU 12 include the frequency synthesizer 26 and an equalizer circuit 95 within the read LSI circuit 24. The equalizer circuit 95 is provided with respect to the MO signal which is obtained from the ID/MO detector 32. In this embodiment, 3 control registers 96, 98 and 100 are provided with respect to the frequency synthesizer 26.

The parameters related to the frequency dividing ratio m/n, the frequency setting of a voltage controlled oscillator (VCO) and the selection of a PLL damping resistance are respectively set in the control registers 96, 98 and 100 by the parameter setting controller 90 of the MPU 12. A control register 102 is provided with respect to the equalizer circuit 95. Parameters related to an equalizer cutoff frequency are set in the control register 102 by the parameter setting controller 90 of the MPU 12. Furthermore, a control register 106 is provided with respect to a sector mark detection circuit 104 of the ODC 14. Parameters related to a sector mark detection cutoff frequency are set in the control register 106 by the parameter setting controller 90 of the MPU 12.

A seek command is transferred to the DSP 16 when the MPU 12 executes a read command from the host unit. The DSP 16 is provided with a seek controller 108. Based on the seek command, the seek controller 108 of the DSP 16 carries out a seek control for positioning the beam spot to a target track on the optical disk 72 simultaneously in parallel with the process of the MPU 12.

Therefore, the parameter setting controller 90 of the MPU 12 can optimize the cutoff frequency of the MO signal equalizer circuit 95 within the read LSI circuit 24 by controlling the setting of the control register 102. In addition, the parameter setting controller 90 can optimize the frequency dividing ratio m/n, the VCO frequency setting and the PLL damping resistance selection of the frequency synthesizer 26 within the read LSI circuit 24 by controlling the setting of the control registers 96, 98 and 100. Furthermore, the parameter setting controller 90 can optimize the cutoff frequency of the sector mark detection circuit 104 within the ODC 14 by controlling the setting of the control register 106.

The firmware of the control unit 10 is installed, for example, by reading the firmware from the optical disk 72 inserted into the enclosure 11 and storing the firmware in the buffer memory 18 under the control of the host unit, and the firmware stored in the buffer memory 18 is executed. In addition, programs executed by the MPU 12 are similarly read from the optical disk 72 inserted into the enclosure 11 and stored in the buffer memory 18 by the MPU 12 under the control of the host unit, for example, and the programs stored in the buffer memory 18 are executed.

Figure 7:
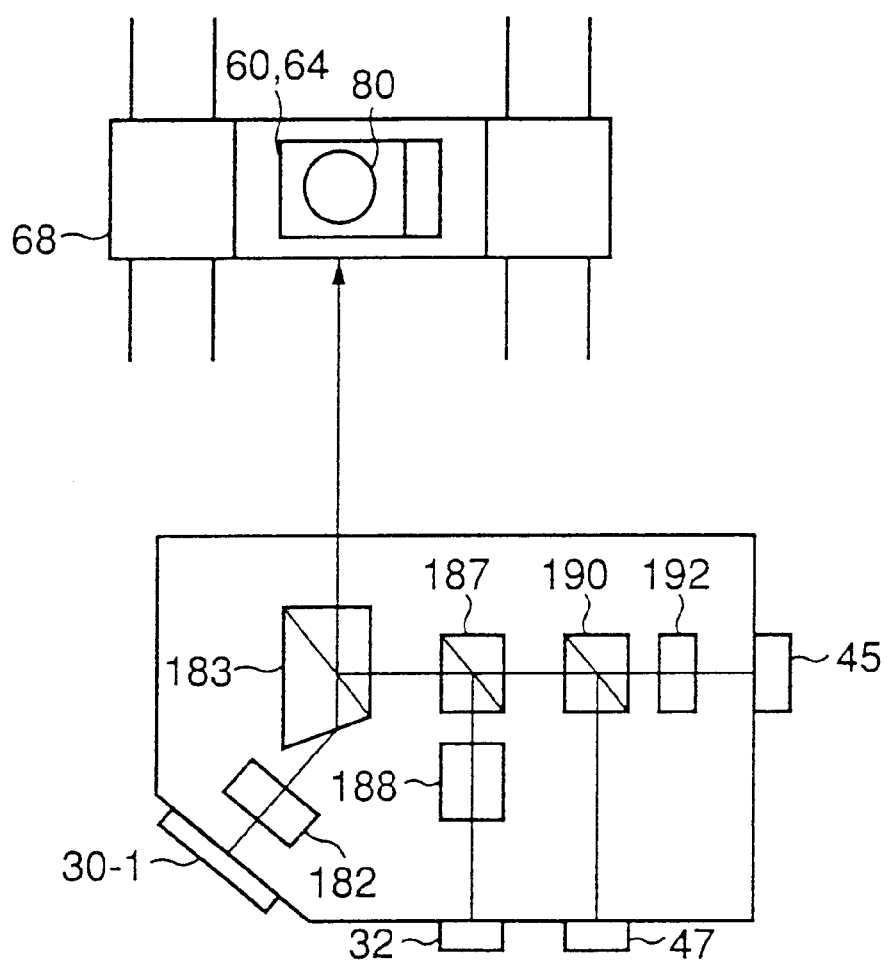
FIG. 7 is a plan view showing an embodiment of an optical system.

FIG. 7 is a plan view showing an embodiment of the optical system of the present invention. In FIG. 7, those parts which are the same as those corresponding parts in FIGS. 4 and 5 are designated by the same reference numerals, and a description thereof will be omitted.

In FIG. 7, the laser beam emitted from the laser diode 30-1 is formed into parallel rays by a collimator lens 182, and is supplied to a beam splitter 183 with a predetermined incident angle, so as to correct the cross sectional shape of the laser beam from an oval shape into a true circular shape. The laser beam transmitted through the beam splitter 183 is converged into the beam spot on the optical disk 72 via the objective lens 80.

The laser beam reflected by the optical disk 72 is reflected by the beam splitter 183, and is supplied to a beam splitter 187. The beam splitter 187 reflects a portion of the laser beam, and irradiates the reflected portion of the laser beam on the ID/MO detector 32 via a Wollaston prism and condenser lens 188. On the other hand, a portion of the laser beam transmitted through the beam splitter 187 is supplied to a beam splitter 190. The beam splitter 190 reflects a portion of the incoming laser beam, and irradiates the reflected portion on the TES detector 47. In addition, a portion of the laser beam transmitted through the beam splitter 190 is irradiated on the FES detector 45 via a Foucault prism 192.

Figure 8:
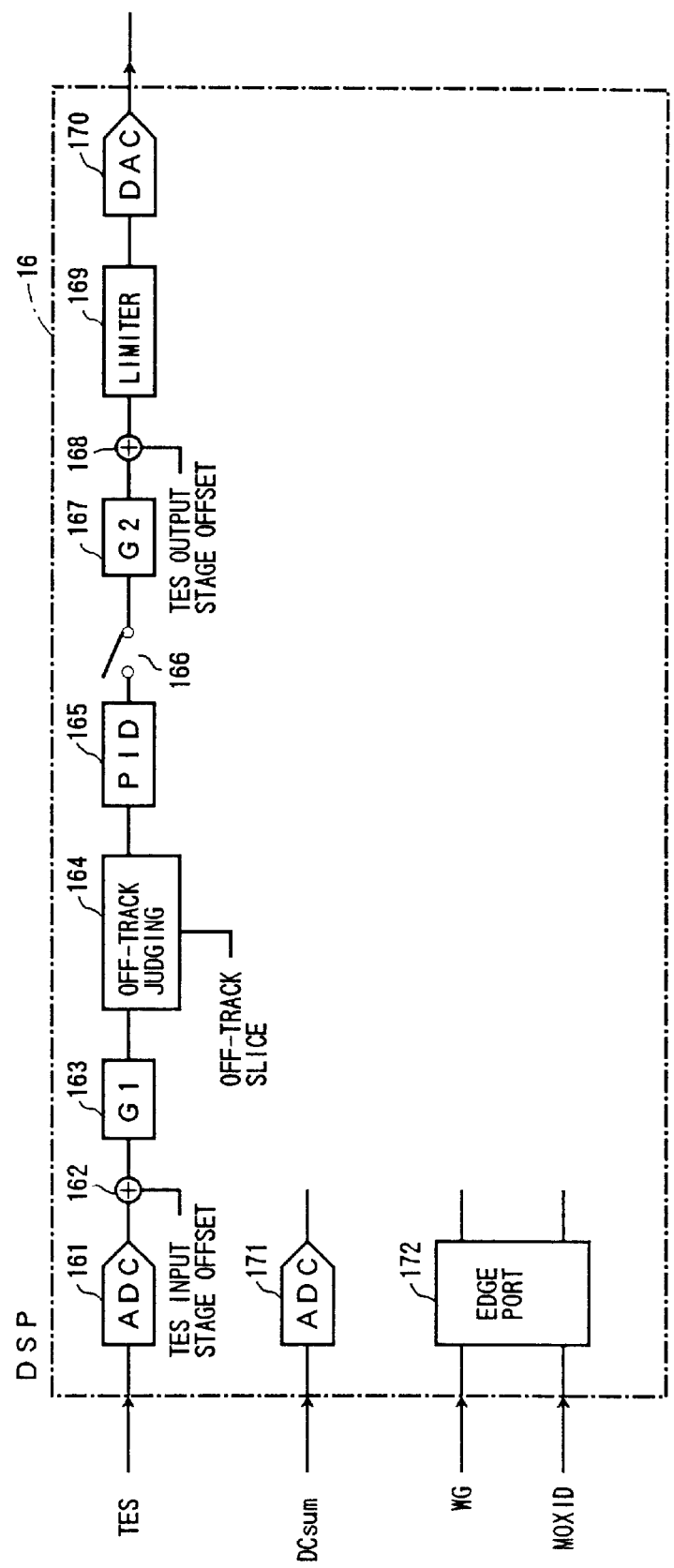
FIG. 8 is a functional block diagram showing the general construction of a servo system within the DSP.

FIG. 8 is a functional block diagram showing the general construction of the servo system within the DSP 16. For the sake of convenience, FIG. 8 only shows a portion of the servo system directly related to the subject matter of the present invention.

In FIG. 8, the DSP 16 includes an analog-to-digital converter (ADC) 161, a node 162, a gain control part 163, an off-track judging part 164, a PID filter 165, a switch 166, a gain control part 167, a node 168, a limiter part 169, a digital-to-analog converter (DAC) 170, and ADC 171, and an edge port 172 which are connected as shown.

The TES from the TES detection circuit 48 is input to the ADC 161 via an amplifier, a lowpass filter and the like (illustration thereof omitted in FIG. 8), and the TES state is recognized by reading the TES for every sampling frequency. The read TES from the ADC 161 and an input stage offset of the TES are input to the node 162 and are added, and the TES from the node 162 is input to the gain control part 163. The input stage offset of the TES is stored in the buffer memory 18, for example. The gain control part 163 multiplies a gain G1 to the TES from the node 162, so as to absorb inconsistencies in the input sensitivity such as the circuit constants and the signal sensitivity.

The TES from the gain control part 163 is input to the off-track judging part 164. The off-track judging part detects the off-track by comparing an absolute value of the input TES and an off-track slice level. More particularly, the off-track is detected when the absolute value of the TES is greater than the off-track slice level, and in this case, an off-track flag is set. For example, the off-track slice level is input from the ODC 14, and is switched between the read process and the write/erase process. Normally, the off-track slice level during the write/erase process is set to a more strict level compared to that during the read process. When the off-track flag is set, the switch 166 which will be described later is controlled to an OFF state by the DSP 16 or the MPU 12, so as to put the track servo to an OFF state.

The TES obtained via the off-track judging part 164 is input to the PID filter 165 wherein a known phase compensation process is carried out. When the switch 166 is ON, an output of the PID filter 165 is input to the gain control part 167 via the switch 166. The gain control part 167 multiplies a gain G2 to the output of the PID filter 165, so as to absorb the inconsistencies in the output sensitivity such as a driving sensitivity of the driver and an acceleration of the actuator. An output of the gain control part 167 is added to an output stage offset of the TES at the node 168, and an output from the node 168 is input to the limiter part 169. The output stage offset of the TES is stored in the buffer memory 18, for example. An output of the limiter part 169 is input to the driver 62 via the DAC 170, and drives and controls the lens actuator 64.

The DC sum signal generated from the DC sum detection circuit 49 is an analog signal which indicates an amount of the reflected light from the optical disk 72. The potential of the DC sum signal increases when the amount of the reflected light increases, and decreases when the amount of the reflected light decreases. Accordingly, the ADC 171 can recognize the state of the reflected light by reading this DC sum signal.

A write gate signal WG is input from the ODC 14, and indicates a start and an end of the write/erase process by edges thereof. For example, the write gate signal WG has edges such that the write gate signal WG falls at the start of the write/erase process and rises at the end of the write/erase process. Hence, the DSP 16 can recognize the existence of the write/erase process, that is, the light emission state, by monitoring the state of the edge port 172. In addition, a signal MOXID is input from the ODC 14, and this signal MOXID indicates whether a present tracking position is located in the MO part or the ID part on the optical disk 72. For example, the signal MOXID has a high level in the MO part, and has a low level in the ID part. Accordingly, by monitoring the state of the edge port 172, the DSP 16 can recognize whether the tracking position is in the MO part or the ID part.

Figure 9:
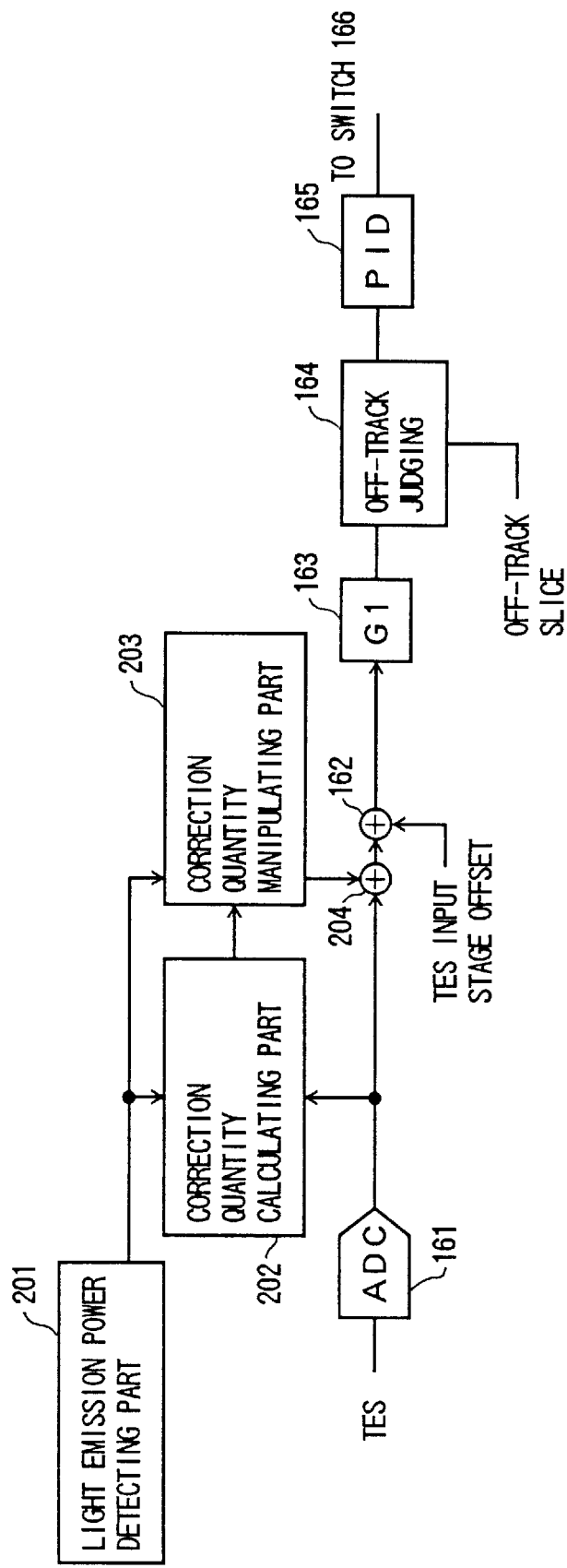
FIG. 9 is a functional block diagram showing the construction of an important part within the DSP.

Next, a description will be given of an important part of this embodiment, by referring to FIGS. 9 through 12. FIG. 9 is a functional block diagram showing the construction of an important part within the DSP 16 of this embodiment. In FIG. 9, those parts which are the same as those corresponding parts in FIG. 8 are designated by the same reference numerals, and a description thereof will be omitted. Further, FIG. 10 is a flow chart for explaining a first embodiment of the tracking control method, and the process shown in FIG. 10 is carried out by the DSP 16.

In FIG. 9, a light emission power detecting part 201 detects a timing at which the light emission power of the laser diode 30-1 changes, based on the DC sum signal which is obtained via the ADC 171 and the write gate signal WG which is obtained via the edge port 172, as will be described later. The light emission power detecting part 201 instructs a correction quantity calculating part 202 to calculate a correction quantity of the TES when the light emission power detecting part 201 detects the timing at which the light emission power changes. The correction quantity calculating part 202 calculates the correction quantity of the TES read via the ADC 161, in response to the instruction from the light emission power calculating part 201, and inputs the calculated correction quantity to a correction quantity manipulating part 203.

The instruction from the light emission power detecting part 201 is also input to the correction quantity manipulating part 203, and the correction quantity manipulating part 203 outputs the correction quantity to a node 204 only during a time in which the correction is validated based on this instruction. The read TES from the ADC 161 is also supplied to the node 204. Hence, the correction quantity is added to the read TES and an output from the node 204 is supplied to the node 162. The process described above in conjunction with FIG. 8 is carried out thereafter.

Figure 10:
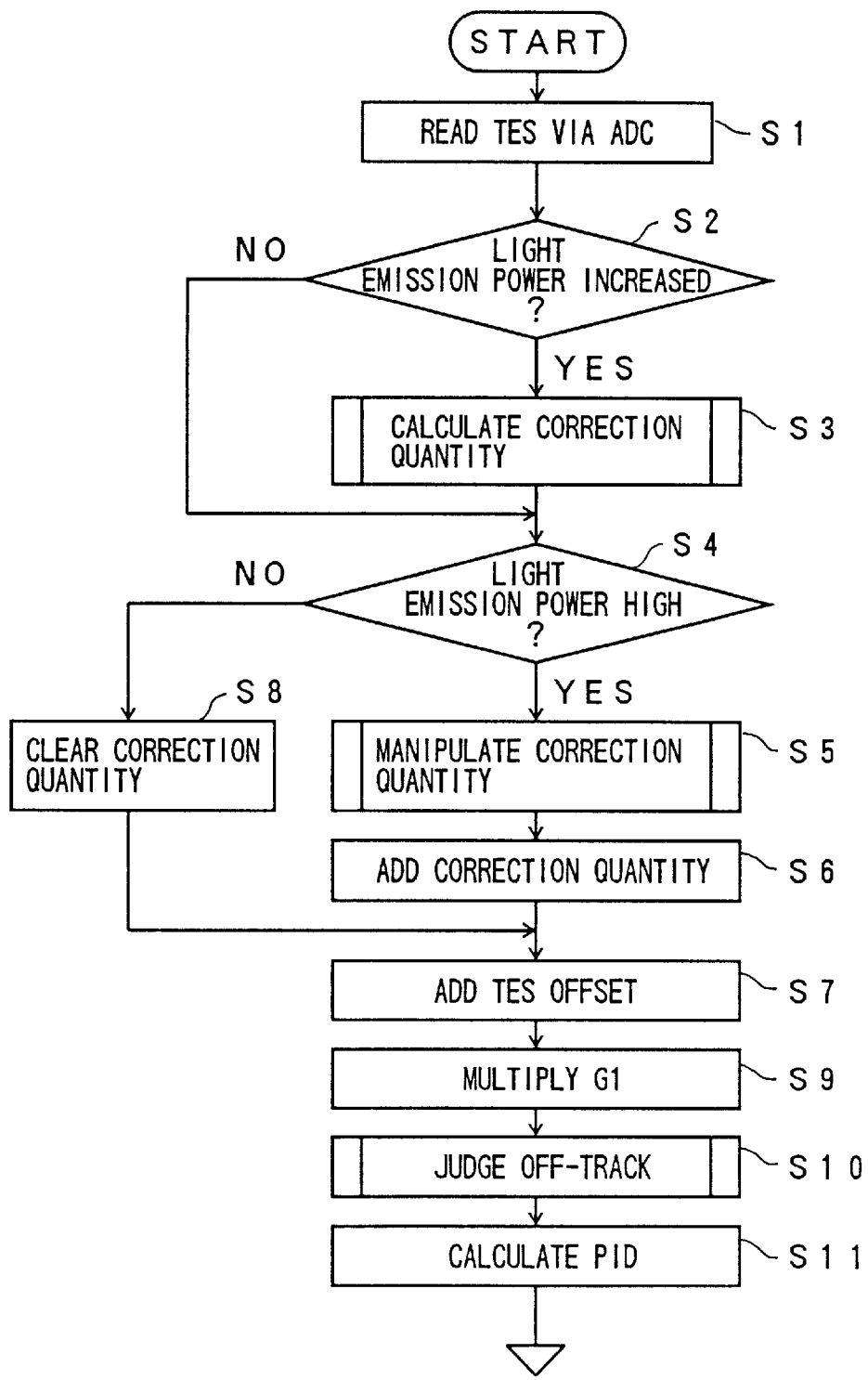
FIG. 10 is a flow chart for explaining a first embodiment of a tracking control method according to the present invention.

FIG. 10 is a flow chart for explaining the first embodiment of the tracking control method, and shows a process carried out at the part of the DSP 16 shown in FIG. 9. In FIG. 10, a step S1 reads the TES from the TES detection circuit 48 via the ADC 161, and a step S2 decides, in the laser power detecting part 201, whether or not the light emission power of the laser diode 30-1 increased, based on the DC sum signal, the write gate signal WG and the like. If the decision result of the step S2 is NO (including a case where the light emission power remains high), the process advances to a step S4. On the other hand, if the decision result in the step S2 is YES, a step S3 calculates the correction quantity of the TES in the correction quantity calculating part 202, and the process then advances to the step S4.

The step S4 decides whether or not the light emission power is in a high state. If the decision result in the step S4 is YES, a step S5 carries out a manipulation in the correction quantity manipulating part 203 to output the correction quantity only during the time in which the correction is validated. In addition, a step S6 adds the correction quantity which is output from the correction quantity manipulating part 203 to the TES which is read via the ADC 161, and the process advances to a step S7. On the other hand, if the decision result in the step S4 is NO, a step S8 clears the correction quantity, and the process advances to the step S7.

The step S7 adds the input stage offset of the TES to the TES which is added with the correction quantity, at the node 162, and a step S9 multiplies the gain G1 in the gain control part 163. A step S10 detects the off-track based on the off-track slice, in the off-track judging part 164. Further, a step S11 carries out the phase compensation by making a PID calculation, in the PID filter 165. A result which is obtained by the above described process is input to the switch 166 shown in FIG. 8.

FIG. 11 is a diagram for explaining a case where the TES is not corrected depending on the change in the light emission power unlike this embodiment. On the other hand, FIG. 12 is a diagram for explaining a case where the TES is corrected depending on the change in the light emission power as in this embodiment.

In FIG. 11, (a) shows the TES which is not corrected depending on the change in the light emission power, and (b) shows the TES which is read via the ADC 161 in this case. In this case, because the TES shift and/or the TES fluctuation is generated at the instant when the light emission power changes, and it may be seen that the tracking control becomes unstable at the start and the end of the write/erase process.

On the other hand, in FIG. 12, (a) shows the TES which is corrected depending on the change in the light emission power, (b) shows the TES which is added with the correction quantity and is obtained via the node 204, and (c) shows the correction quantity which is calculated in this case. In this case, although the TES shift and/or the TES fluctuation is generated at the instant when the light emission power changes, an unstable state indicated by a broken line in FIG. 12(b) will not be generated, and it may be seen that the tracking control can be maintained stable even at the start and the end of the write/erase process.

Figure 13:
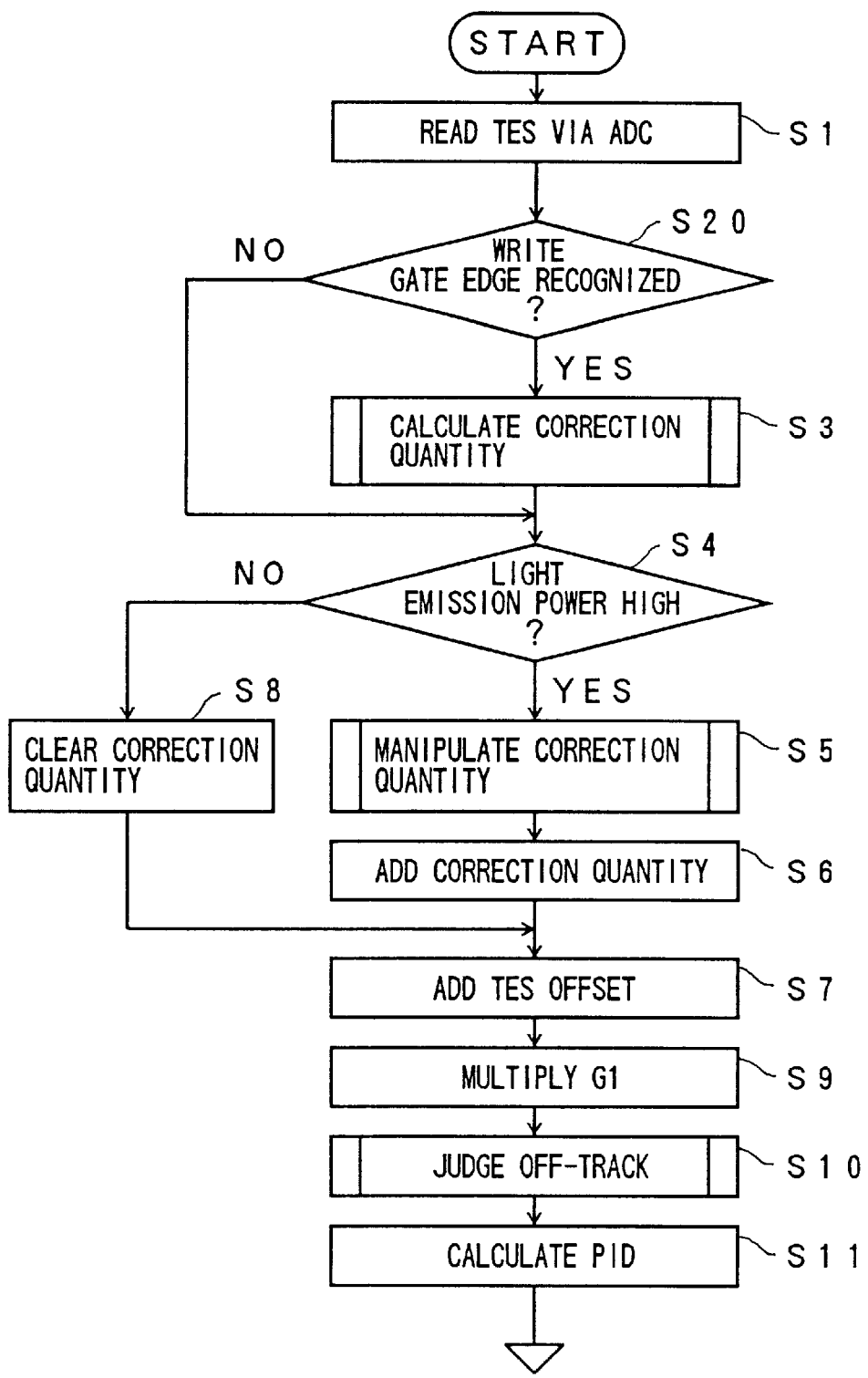
FIG. 13 is a flow chart for explaining a second embodiment of the tracking control method according to the present invention.
Figure 14:
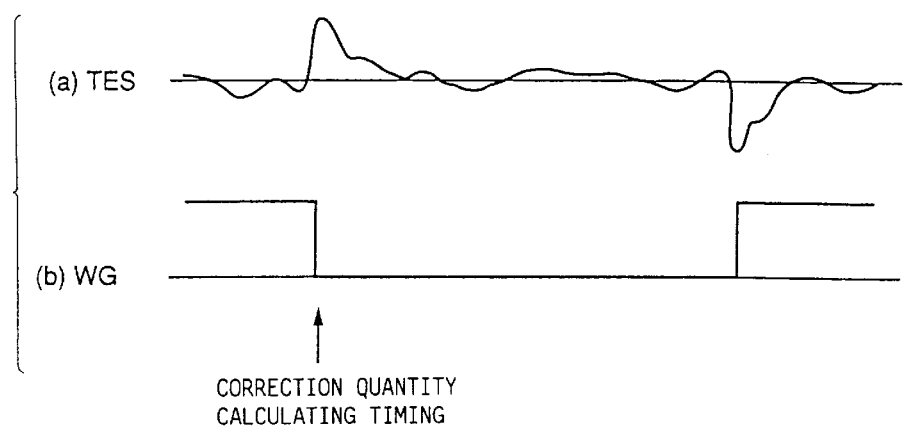
FIG. 14 is a diagram for explaining the operation of the second embodiment of the tracking control method.

Next, a description will be given of a second embodiment of the tracking control method according to the present invention, by referring to FIGS. 13 and 14. FIG. 13 is a flow chart for explaining this second embodiment of the tracking control method, and shows a process carried out by the DSP 16. In FIG. 13, those steps which are the same as those corresponding parts in FIG. 10 are designated by the same reference numerals, and a description thereof will be omitted. FIG. 14 is a diagram for explaining the operation of this second embodiment of the tracking control method.

In FIG. 13, a step S20 decides, in the light emission power detecting part 201, whether or not the light emission power of the laser diode 30-1 increased, based on the write gate signal WG. More particularly, the step S20 decides whether or not the falling edge of the write gate signal WG is recognized. The write gate signal WG is a signal which falls at the start of the write/erase process and rises at the end of the write/erase process, and is mainly supplied to the write LSI circuit 20 from the ODC 14. Accordingly, by monitoring the falling edge of the write gate signal WG, it is possible to detect the change in the light emission power. The process advances to the step S3 if the decision result in the step S20 is YES, and the process advances to the step S4 if the decision result in the step S20 is NO.

In FIG. 14, (a) shows the TES before the correction is carried out depending on the change in the light emission power, and (b) shows the write gate signal WG. In this embodiment, the step S3 starts calculating the correction quantity in the correction quantity calculating part 202 at the time when the falling edge of the write gate signal WG is recognized as shown in FIG. 14(b).

Figure 15:
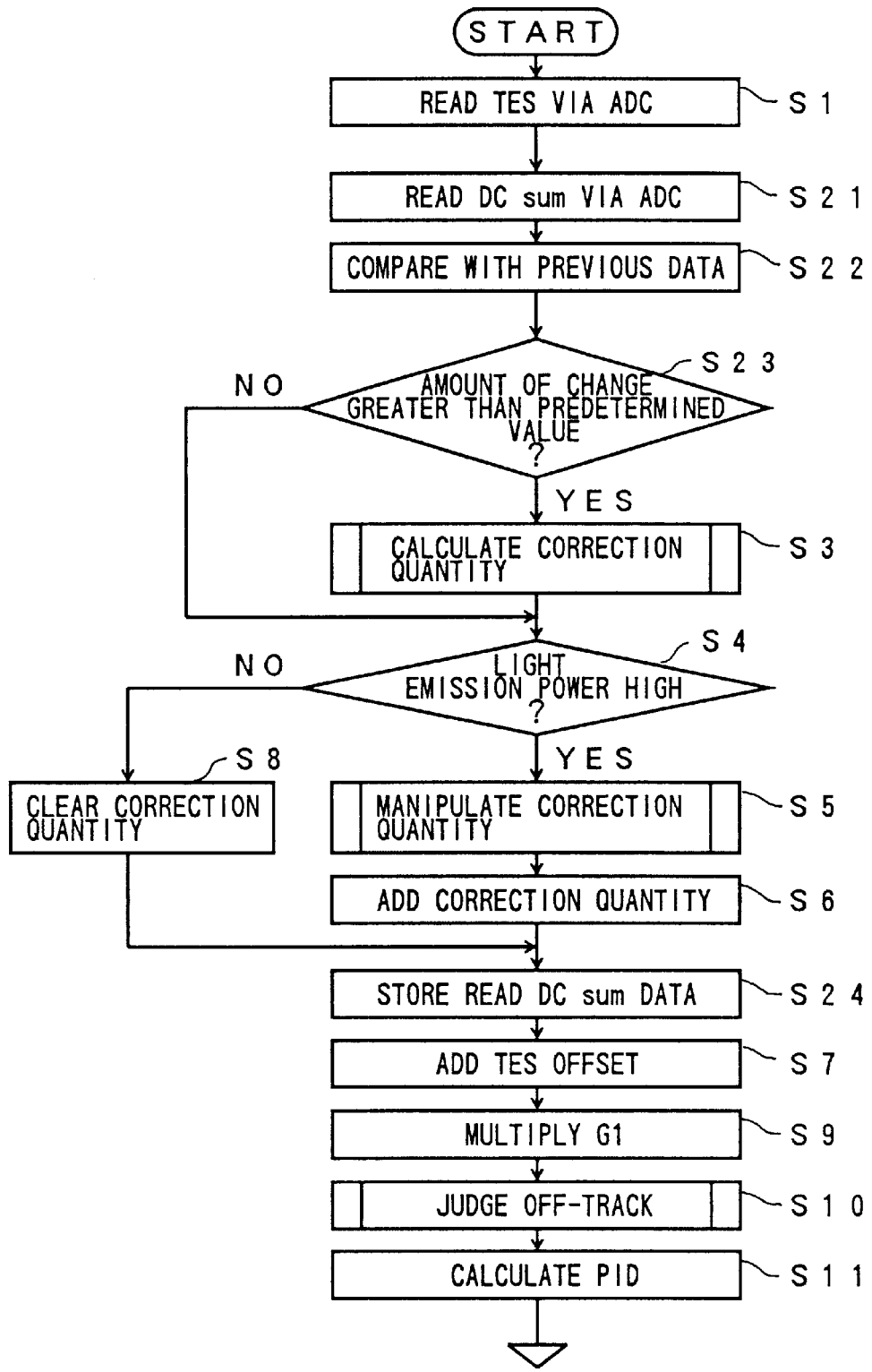
FIG. 15 is a flow chart for explaining a third embodiment of the tracking control method according to the present invention.
Figure 16:
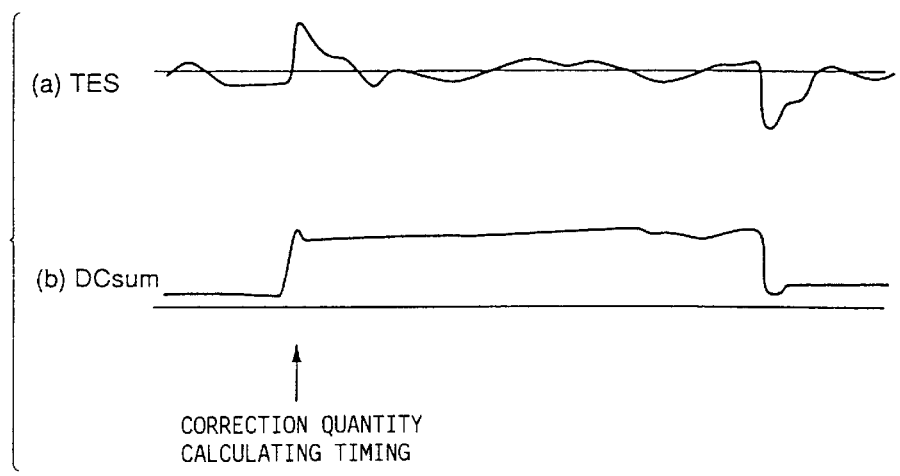
FIG. 16 is a diagram for explaining the operation of the third embodiment of the tracking control method.

Next, a description will be given of a third embodiment of the tracking control method according to the present invention, by referring to FIGS. 15 and 16. FIG. 15 is a flow chart for explaining this third embodiment of the tracking control method, and shows a process carried out by the DSP 16. In FIG. 15, those steps which are the same as those corresponding parts in FIG. 10 are designated by the same reference numerals, and a description thereof will be omitted. FIG. 16 is a diagram for explaining the operation of this third embodiment of the tracking control method.

In FIG. 15, a step S21 reads the DC sum signal via the ADC 171, and a step S22 obtains an amount of change of the DC sum signal by comparing the read DC sum signal and the stored DC sum signal which is read at the previous sampling point. A step S23 decides, in the light emission power detecting part 201, whether or not the amount of change of the DC sum signal is greater than a predetermined value. The process advances to a step S3 if the decision result in the step S23 is YES, and the process advances to a step S4 if the decision result in the step S23 is NO.

The potential of the DC sum signal increases when the amount of light of the reflected light beam from the optical disk 72 increases, and decreases when the amount of light of the reflected light beam from the optical disk 72 decreases. Accordingly, it is possible to recognize a start timing of the write/erase process when an amount of increase in the potential of the DC sum signal is greater than a predetermined value, and to recognize an end timing of the write/erase process when the amount of increase in the potential of the DC sum signal is less than or equal to the predetermined value. Hence, when the amount of change in the DC sum signal is greater than the predetermined value, the step S3 calculates the correction quantity in the correction quantity calculating part 202. In addition, after the step S6 or S8, a step S24 is carried out before the process advances to the step S7. The step S24 stores the present read DC sum signal as a DC sum signal which is read at the previous sampling point for use in comparison with a DC sum signal which is read at a next sampling point.

In FIG. 16, (a) shows the TES before the correction is carried out depending on the change in the light emission power, and (b) shows the DC sum signal. In this embodiment, the step S3 starts calculating the correction quantity in the correction quantity calculating part 202 at the point in time when the rising edge of the DC sum signal is recognized as shown in FIG. 16(b).

Figure 17:
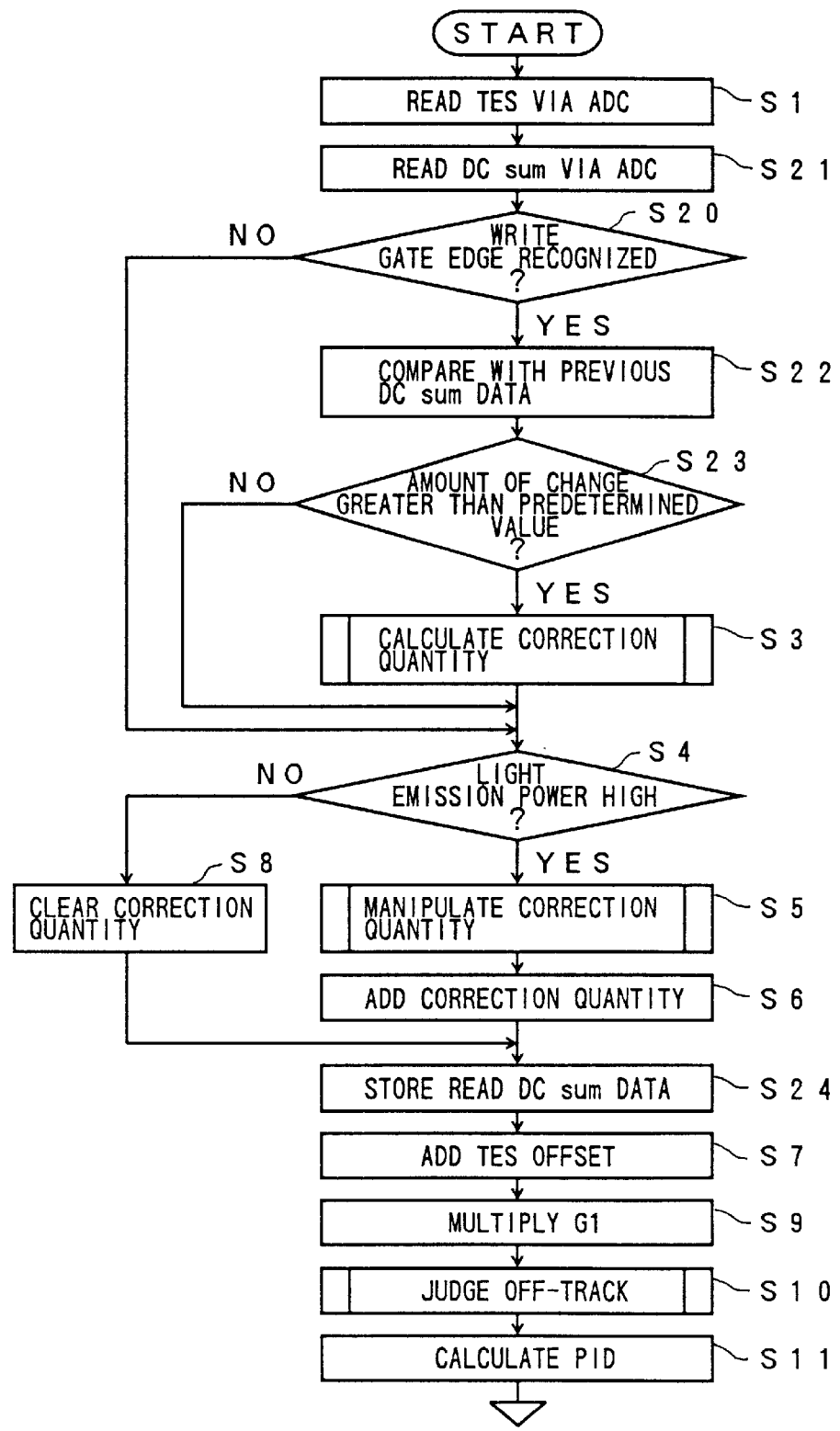
FIG. 17 is a flow chart for explaining a fourth embodiment of the tracking control method according to the present invention.
Figure 18:
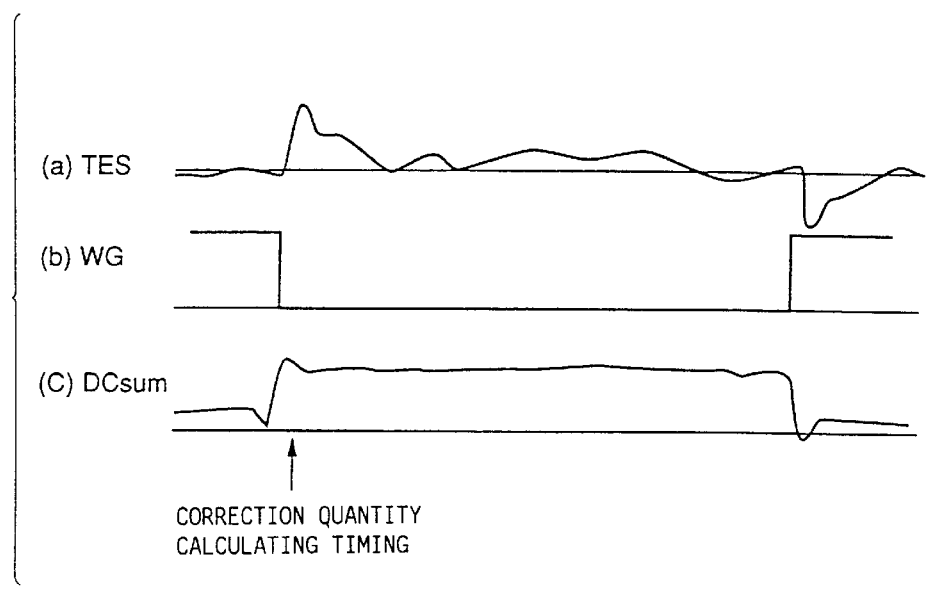
FIG. 18 is a diagram for explaining the operation of the fourth embodiment of the tracking control method.

Next, a description will be given of a fourth embodiment of the tracking control method according to the present invention, by referring to FIGS. 17 and 18. FIG. 17 is a flow chart for explaining this fourth embodiment of the tracking control method, and shows a process carried out by the DSP 16. In FIG. 17, those steps which are the same as those corresponding parts in FIGS. 13 and 15 are designated by the same reference numerals, and a description thereof will be omitted. FIG. 18 is a diagram for explaining the operation of this fourth embodiment of the tracking control method.

In FIG. 17, the step S3 calculates the correction quantity when the decision result in the step S20 and the decision result in the step S23 are both YES. In other words, this embodiment detects the change in the light emission power at the timing when the falling edge of the write gate signal WG and the rising edge of the DC sum signal are detected.

In FIG. 18, (a) shows the TES before the correction is carried out depending on the change in the light emission power, (b) shows the write gate signal WG, and (c) shows the DC sum signal. In this embodiment, the step S3 starts calculating the correction quantity in the correction quantity calculating part 202 at the point in time when the falling edge of the write gate signal WG and the rising edge of the DC sum signal are detected, as shown in FIG. 18(b) and FIG. 18(c).

Figure 19:
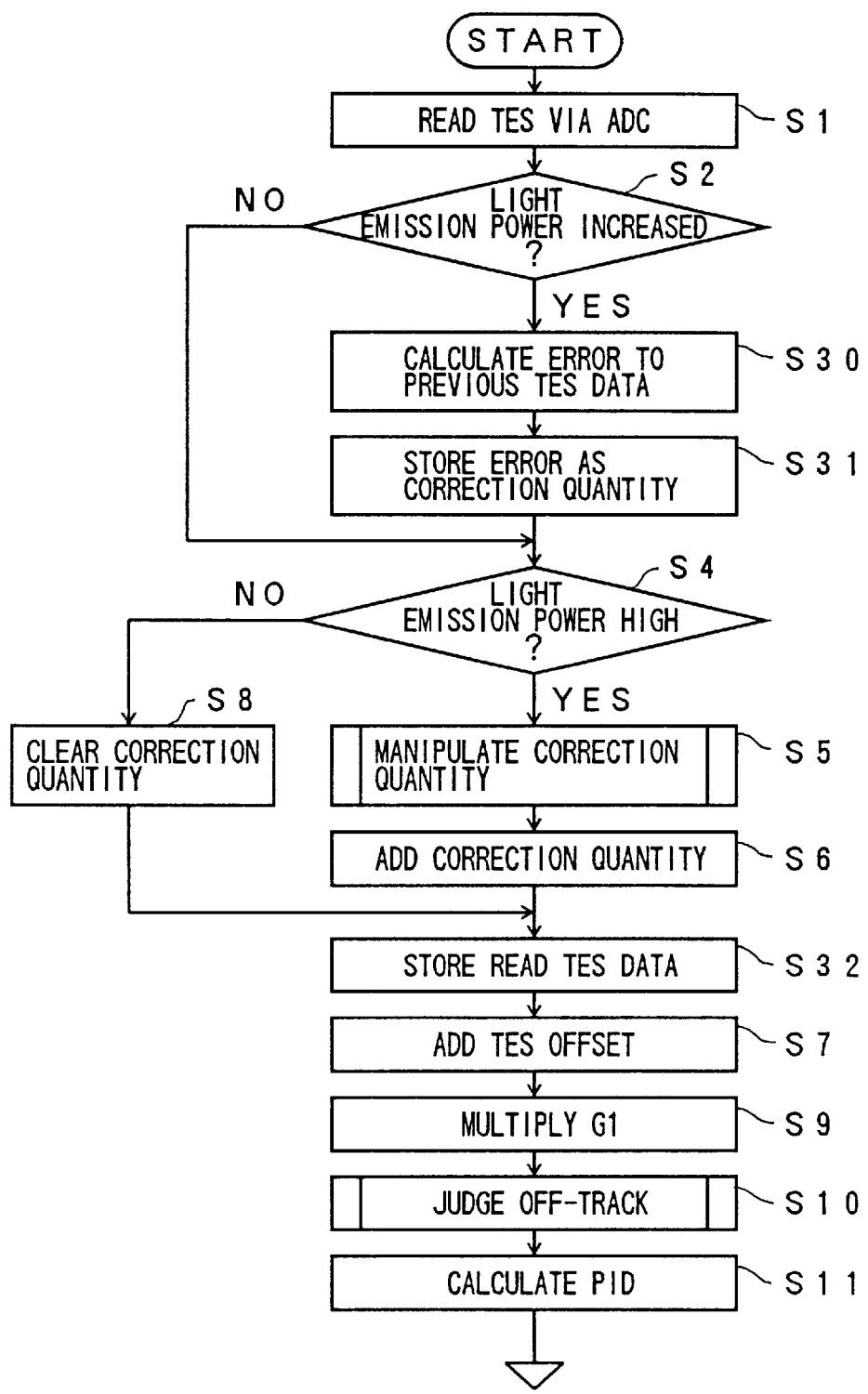
FIG. 19 is a flow chart for explaining a fifth embodiment of the tracking control method according to the present invention.
Figure 20:
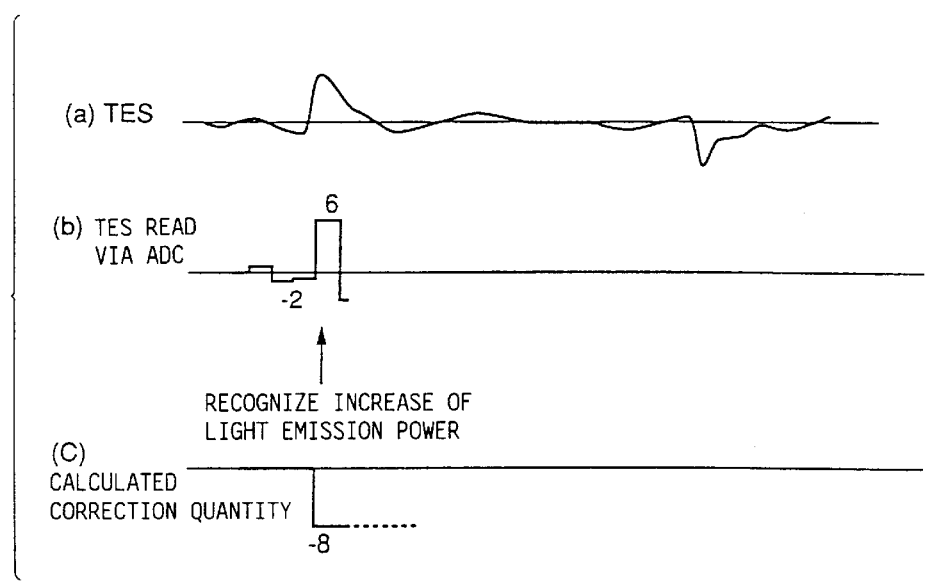
FIG. 20 is a diagram for explaining the operation of the fifth embodiment of the tracking control method.

Next, a description will be given of a fifth embodiment of the tracking control method according to the present invention, by referring to FIGS. 19 and 20. FIG. 19 is a flow chart for explaining this fifth embodiment of the tracking control method, and shows a process carried out by the DSP 16. In FIG. 19, those steps which are the same as those corresponding parts in FIG. 10 are designated by the same reference numerals, and a description thereof will be omitted. FIG. 20 is a diagram for explaining the operation of this fifth embodiment of the tracking control method.

In this embodiment, an error between the TES which is sampled when the change in the light emission power is detected and the TES which is sampled immediately before is used as the correction quantity in the correction quantity calculating part 202. In FIG. 19, a step S30 calculates, in the correction quantity calculating part 202, the error between the TES which is sampled when the change in the light emission power is detected and the TES which is sampled immediately before. In addition, a step S31 stores the calculated error in the correction quantity calculating part 202, as the correction quantity. In other words, in this embodiment, the steps S30 and S31 correspond to the step S3 shown in FIG. 10. Furthermore, after the step S6 or S8, the process advances to the step S7 after carrying out a step S32. This step S32 stores the present read TES as a TES which is read at the previous sampling point for use in comparison with a TES which is read at a next sampling point.

In FIG. 20, (a) shows the TES before the correction is carried out depending on the change in the light emission power, (b) shows the TES which is read via the ADC 161, and (c) shows the correction quantity which is calculated in this case. As shown in FIG. 20, when the increase of the light emission power is detected, and the sampled TES is "6" and the TES sampled immediately before is "−2", a value "−8 (=−2−6)" is set as the correction quantity.

Figure 21:
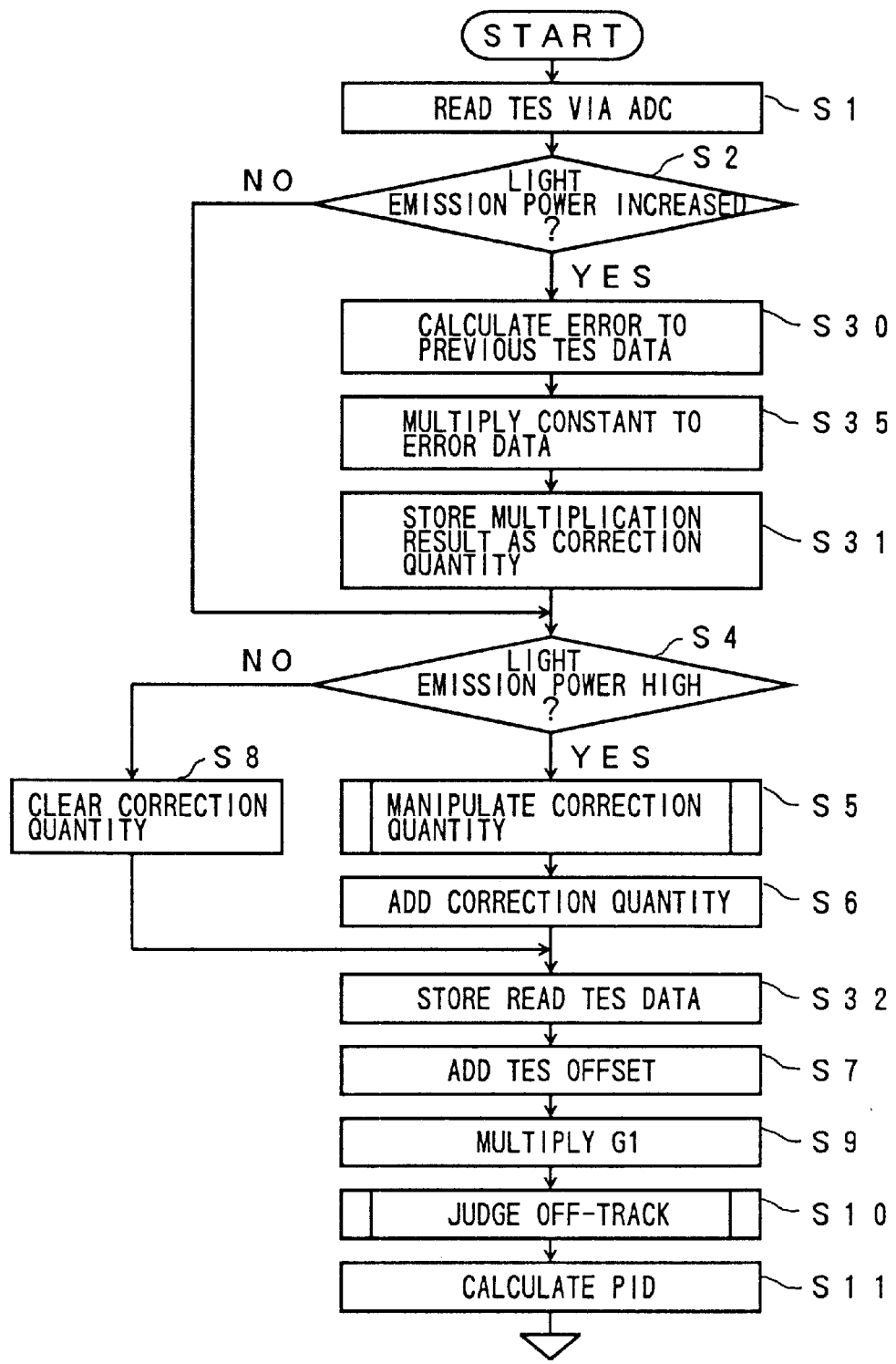
FIG. 21 is a flow chart for explaining a sixth embodiment of the tracking control method according to the present invention.
Figure 22:
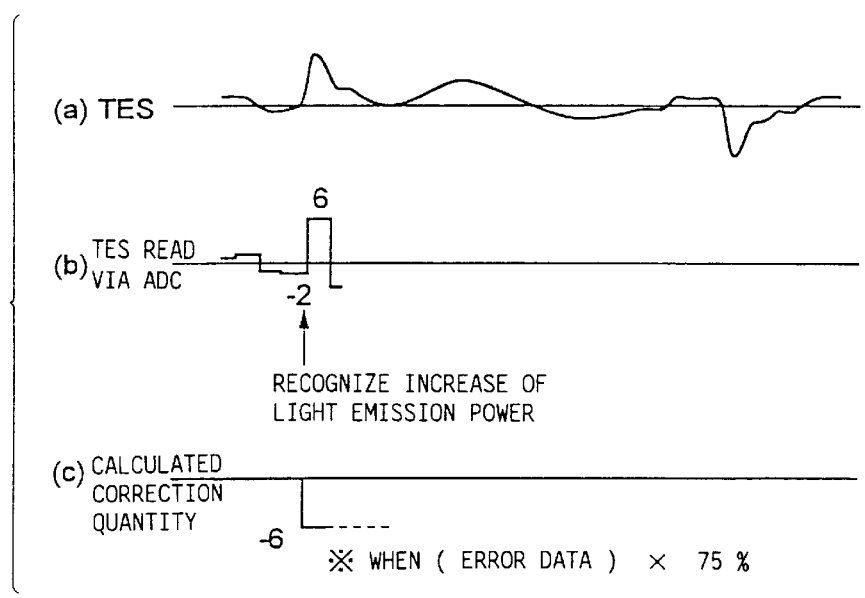
FIG. 22 is a diagram for explaining the operation of the sixth embodiment of the tracking control method.

Next, a description will be given of a sixth embodiment of the tracking control method according to the present invention, by referring to FIGS. 21 and 22. FIG. 21 is a flow chart for explaining this sixth embodiment of the tracking control method, and shows a process carried out by the DSP 16. In FIG. 21, those steps which are the same as those corresponding parts in FIG. 19 are designated by the same reference numerals, and a description thereof will be omitted. FIG. 22 is a diagram for explaining the operation of this sixth embodiment of the tracking control method.

In this embodiment, a value which is obtained by multiplying a constant to an error between the TES that is sampled when the change in the light emission power is detected and the TES that is sampled immediately before, is used as the correction quantity in the correction quantity calculating part 202. In FIG. 21, a step S35 multiplies a constant to the TES which is sampled when the change in the light emission power is detected and the TES which is sampled immediately before, in the correction quantity calculating part 202. Hence, the step S31 stores a multiplication result of the step S35 as the correction quantity, in the correction quantity calculating part 202.

In FIG. 22, (a) shows the TES before the correction is carried out depending on the change in the light emission power, (b) shows the TES which is read via the ADC 161, and (c) shows the correction quantity which is calculated in this case. As shown in FIG. 22, when the increase of the light emission power is detected, and the sampled TES is "6" and the TES sampled immediately before is "−2", a value "−6 (=(−2−6)·75%)" is set as the correction quantity if the multiplied constant is "75%".

Figure 23:
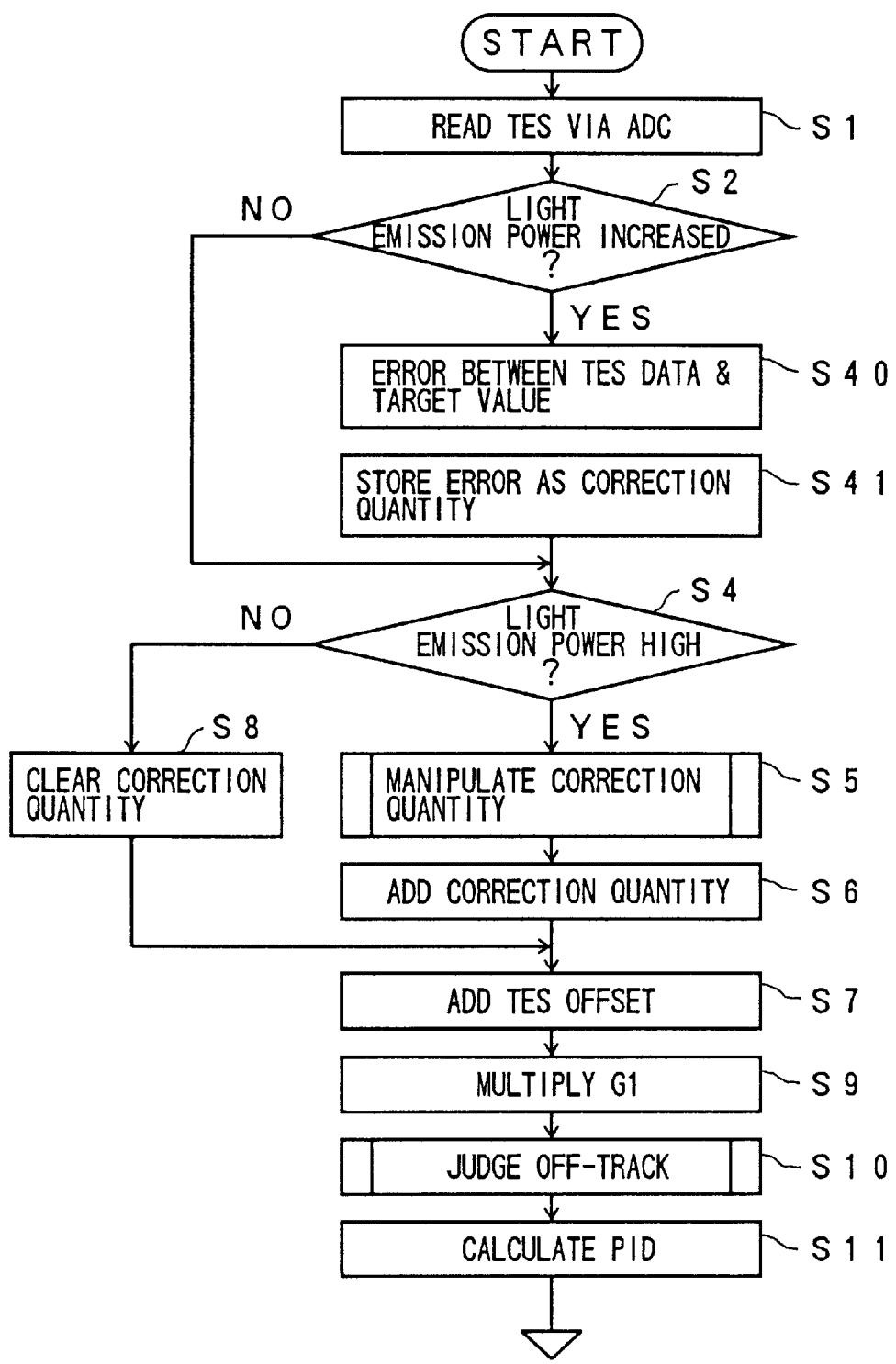
FIG. 23 is a flow chart for explaining a seventh embodiment of the tracking control method according to the present invention.
Figure 24:
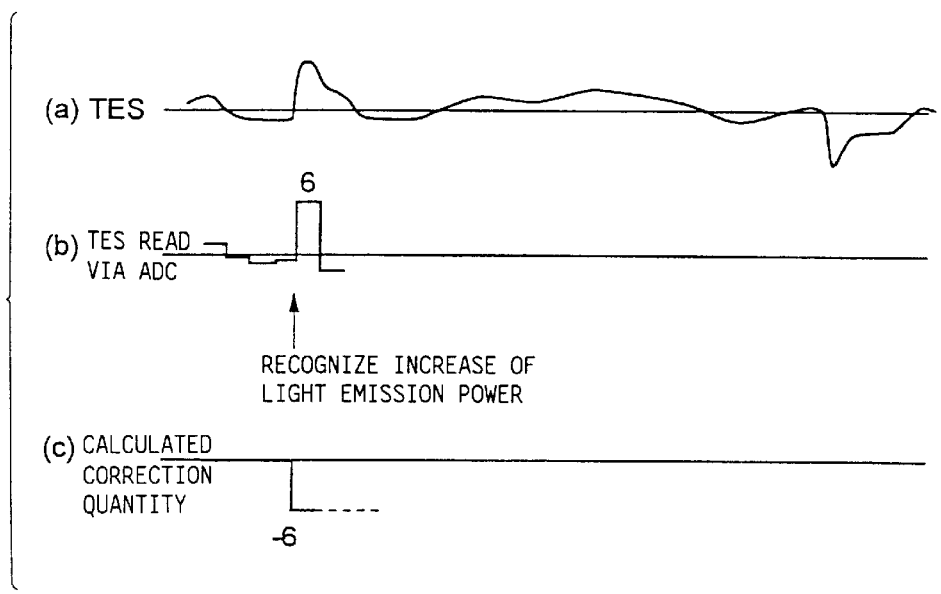
FIG. 24 is a diagram for explaining the operation of the seventh embodiment of the tracking control method.

Next, a description will be given of a seventh embodiment of the tracking control method according to the present invention, by referring to FIGS. 23 and 24. FIG. 23 is a flow chart for explaining this seventh embodiment of the tracking control method, and shows a process carried out by the DSP 16. In FIG. 23, those steps which are the same as those corresponding parts in FIG. 10 are designated by the same reference numerals, and a description thereof will be omitted. FIG. 24 is a diagram for explaining the operation of this seventh embodiment of the tracking control method.

In this embodiment, an error between the TES which is sampled when the change in the light emission power is detected and a tracking control target value, is used as the correction quantity in the correction quantity calculating part 202. In FIG. 23, a step S40 calculates an error between the TES which is sampled when the change in the light emission power is detected and the tracking control target value, in the correction quantity calculating part 202. For example, the tracking control target value is "0". A step S41 stores the error calculated in the step S40 as the correction quantity, in the correction quantity calculating part 202.

In FIG. 24, (a) shows the TES before the correction is carried out depending on the change in the light emission power, (b) shows the TES which is read via the ADC 161, and (c) shows the correction quantity which is calculated in this case. As shown in FIG. 24, when the increase in the light emission power is detected, and the sampled TES is "6" and the tracking control target value is "0", an error "−6(=0−6)" is set as the correction quantity.

Figure 25:
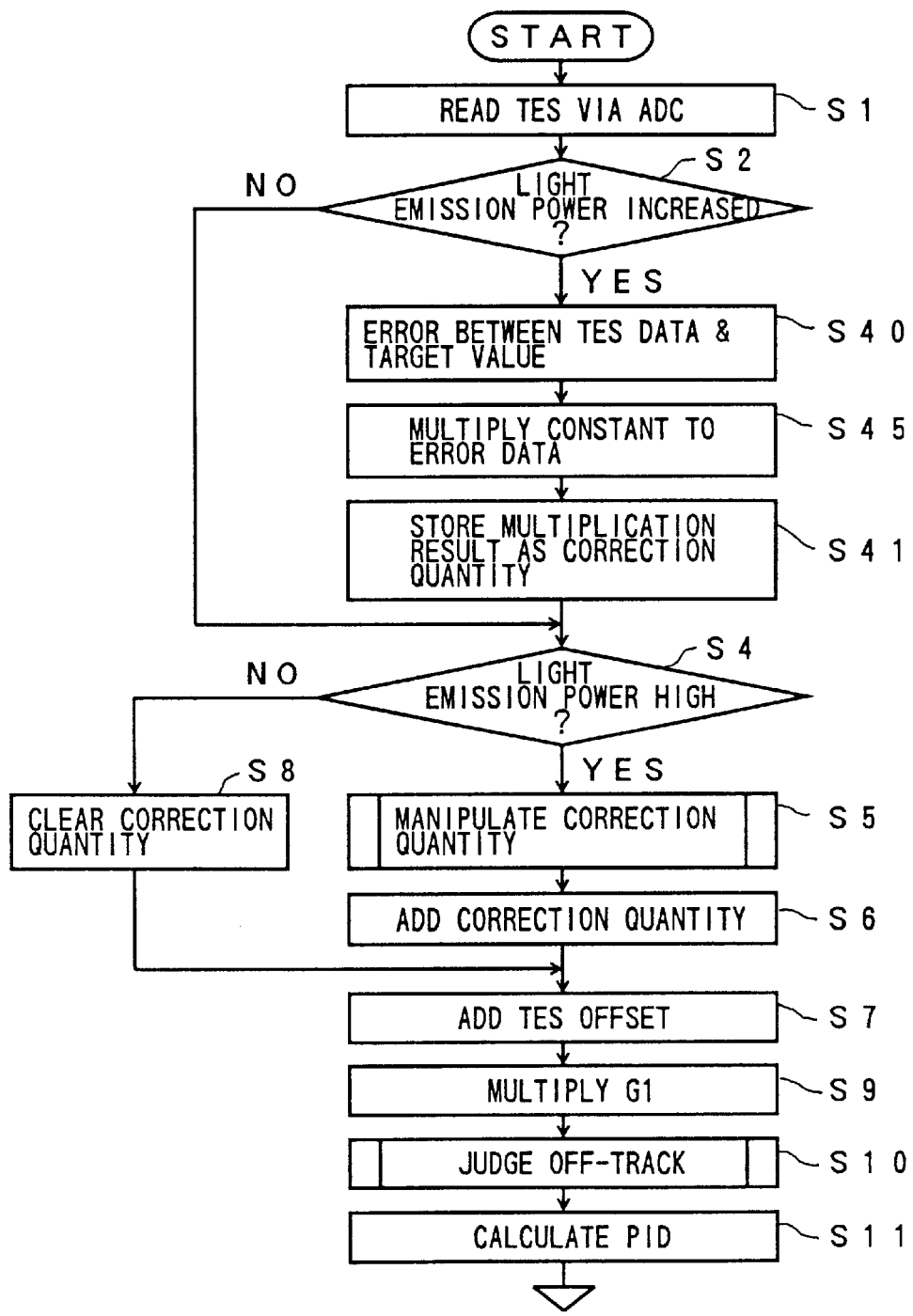
FIG. 25 is a flow chart for explaining an eighth embodiment of the tracking control method according to the present invention.
Figure 26:
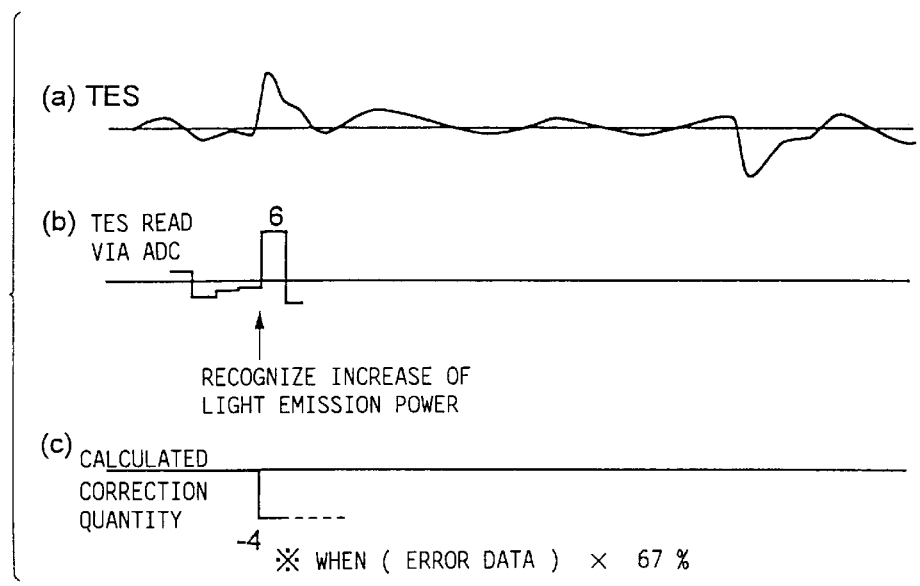
FIG. 26 is a diagram for explaining the operation of the eighth embodiment of the tracking control method.

Next, a description will be given of an eighth embodiment of the tracking control method according to the present invention, by referring to FIGS. 25 and 26. FIG. 25 is a flow chart for explaining this eighth embodiment of the tracking control method, and shows a process carried out by the DSP 16. In FIG. 25, those steps which are the same as those corresponding parts in FIG. 23 are designated by the same reference numerals, and a description thereof will be omitted. FIG. 26 is a diagram for explaining the operation of this eighth embodiment of the tracking control method.

In this embodiment, a value which is obtained by multiplying a constant to an error between the TES that is sampled when the change in the light emission power is detected and the tracking control target value, is used as the correction quantity in the correction quantity calculating part 202. In FIG. 25, a step S45 multiplies a constant to the error calculated in the step S40, in the correction quantity calculating part 202. The step S41 stores a multiplication result of the step S45 as the correction quantity.

In FIG. 26, (a) shows the TES before the correction is carried out depending on the change in the light emission power, (b) shows the TES which is read via the ADC 161, and (c) shows the correction quantity which is calculated in this case. As show in FIG. 26, when the increase of the light emission power is detected, and the sampled TES is "6" and the tracking control target value is "0", a value "−4(=(0−6) ·67%)" is set as the correction quantity if the multiplied constant is "67%".

Figure 27:
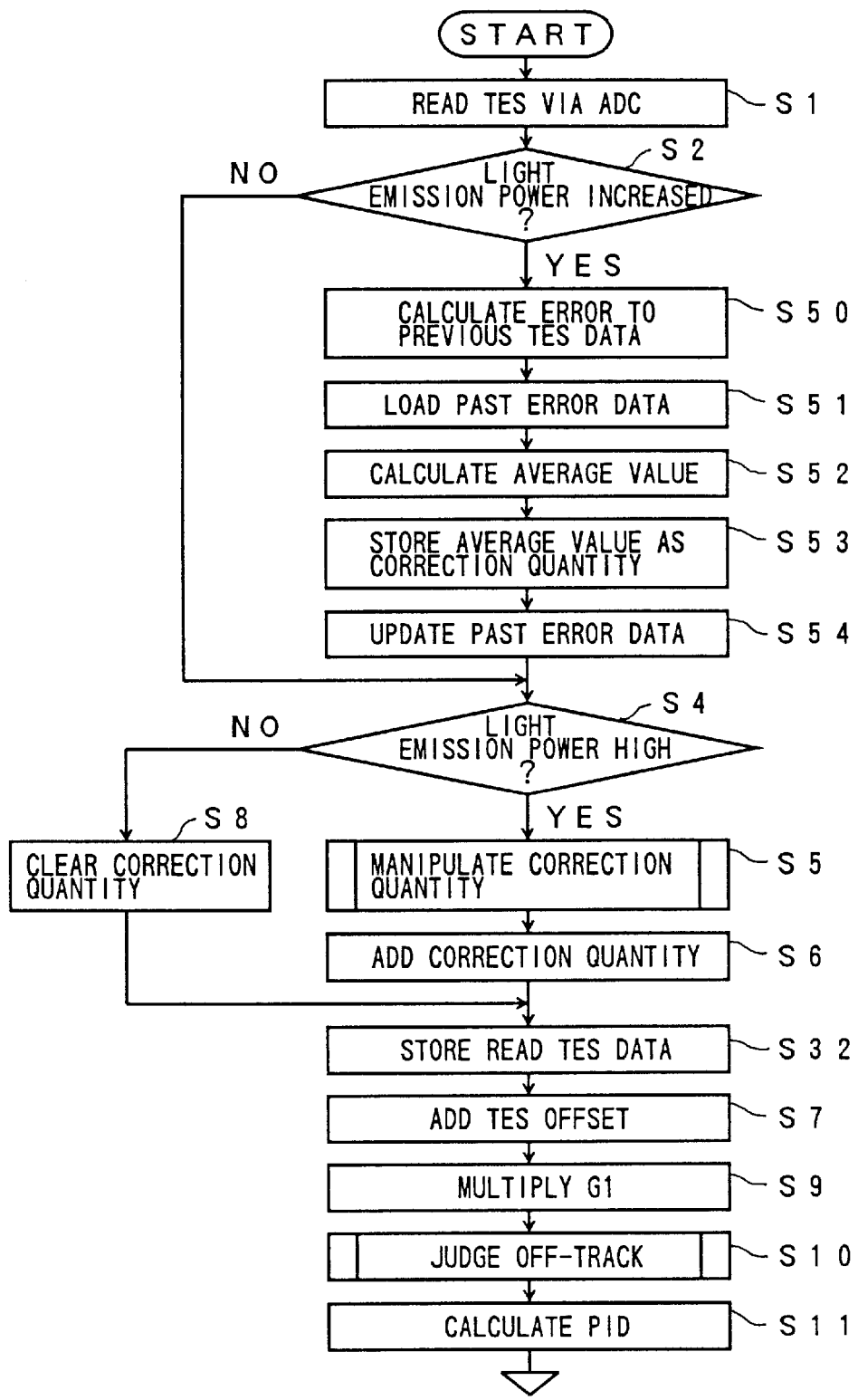
FIG. 27 is a flow chart for explaining a ninth embodiment of the tracking control method according to the present invention.
Figure 28:
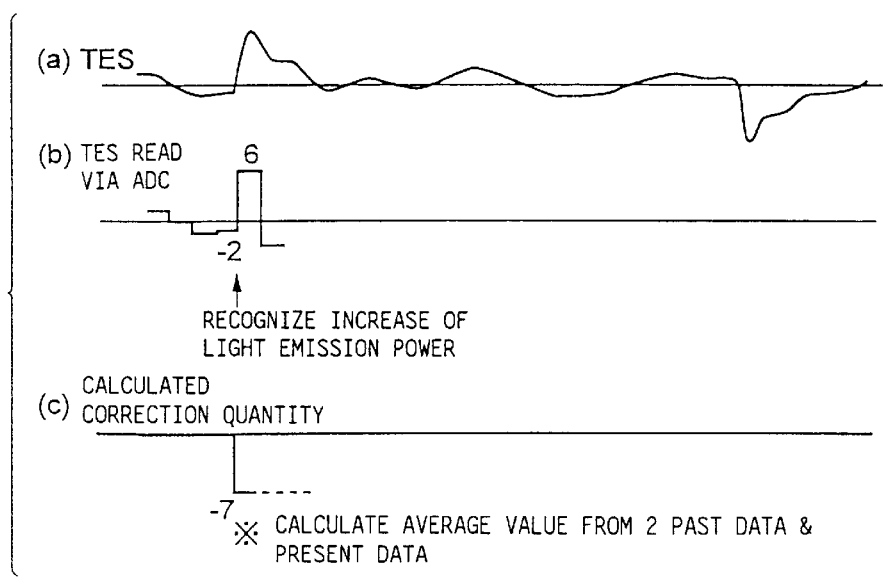
FIG. 28 is a diagram for explaining the operation of the ninth embodiment of the tracking control method.

Next, a description will be given of a ninth embodiment of the tracking control method according to the present invention, by referring to FIGS. 27 and 28. FIG. 27 is a flow chart for explaining this ninth embodiment of the tracking control method, and shows a process carried out by the DSP 16. In FIG. 27, those steps which are the same as those corresponding parts in FIGS. 10 and 19 are designated by the same reference numerals, and a description thereof will be omitted. FIG. 28 is a diagram for explaining the operation of this ninth embodiment of the tracking control method.

In this embodiment, the correction quantity calculating part 202 calculates an error between the TES which is sampled when the change in the light emission power is detected and the TES which is sampled immediately before. In addition, the correction quantity calculating part 202 stores a plurality of such errors, and uses an average value of the stored errors as the correction quantity. In FIG. 27, steps S50 through S54 are carried out in the correction quantity calculating part 202. The step S50 calculates the error between the TES which is sampled when the change in the light emission power is detected and the TES which is sampled immediately before. The step S51 loads a plurality of past errors which are stored, and the step S52 calculates an average value of the present calculated error and the plurality of stored errors. The step S53 stores the calculated average value as the correction quantity. The step S54 updates the past errors so as to include the present calculated error.

In FIG. 28, (a) shows the TES before the correction is carried out depending on the change in the light emission power, (b) shows the TES which is read via the ADC 161, and (c) shows the correction quantity which is calculated in this case. As shown in FIG. 28, when the increase of the light emission power is detected, and the sampled TES is "6" and the TES sampled immediately before is "−2", an error "−8(=−2−6)" is calculated. Further, if a previously stored past error is "−6" and a last but one stored past error is "−7", for example, an average value of the present error and the past errors is "−7(=(−6−8−7)/3)", and this average value "−7" is stored as the correction quantity. In addition, the stored past errors "−6" and "−7" are updated to "−8" and "−6" so as to include the present error "−8".

Of course, if past errors do not exist, it is possible to employ techniques such as, not calculating the correction quantity until a predetermined number of errors are calculated and stored, calculating an average value based only on errors which are already stored and using the average value as the correction quantity, and calculating an average value by regarding each of an insufficient number of errors to be "0" if a predetermined number of errors are not stored and using the average value as the correction quantity.

Figure 29:
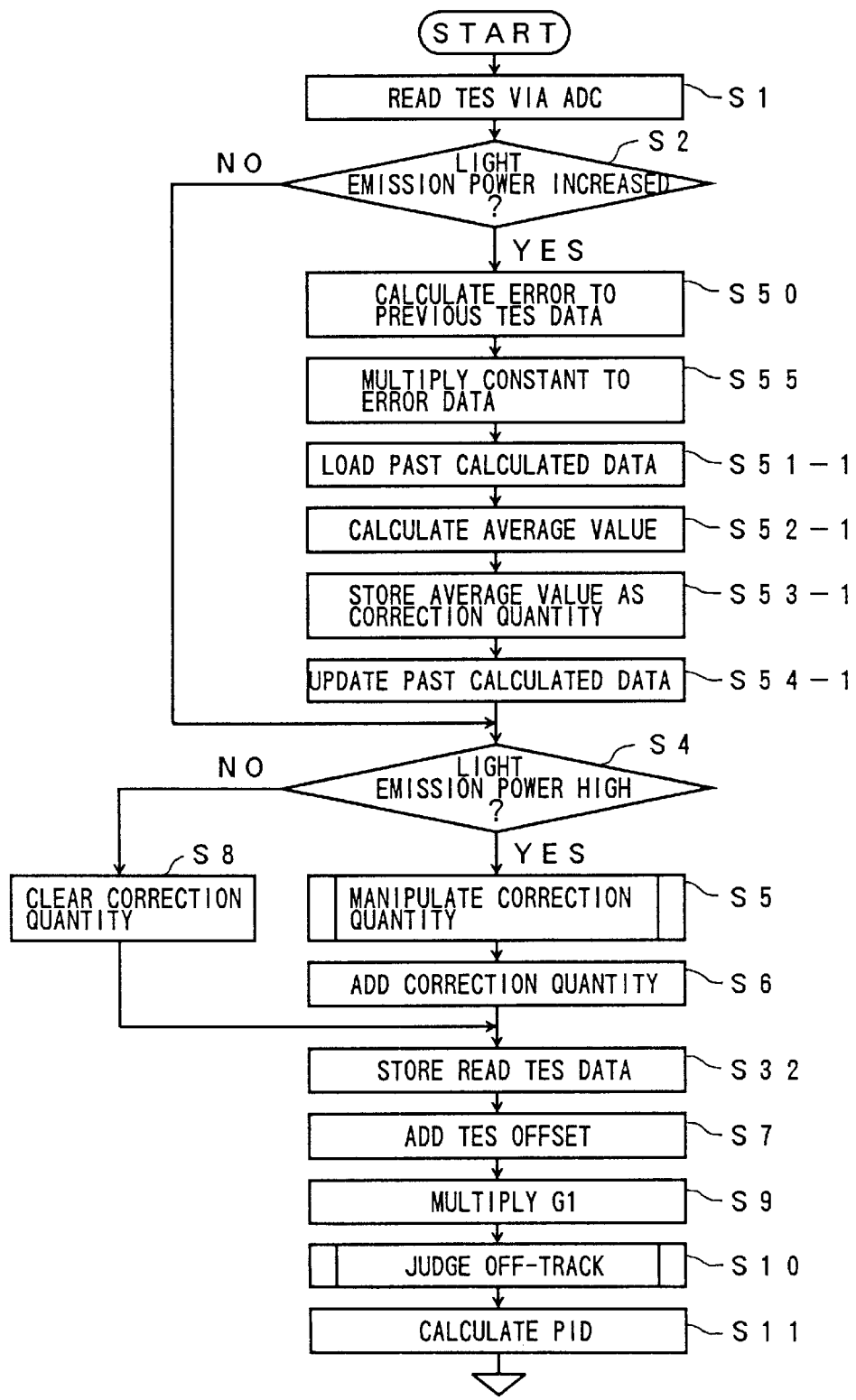
FIG. 29 is a flow chart for explaining a tenth embodiment of the tracking control method according to the present invention.
Figure 30:
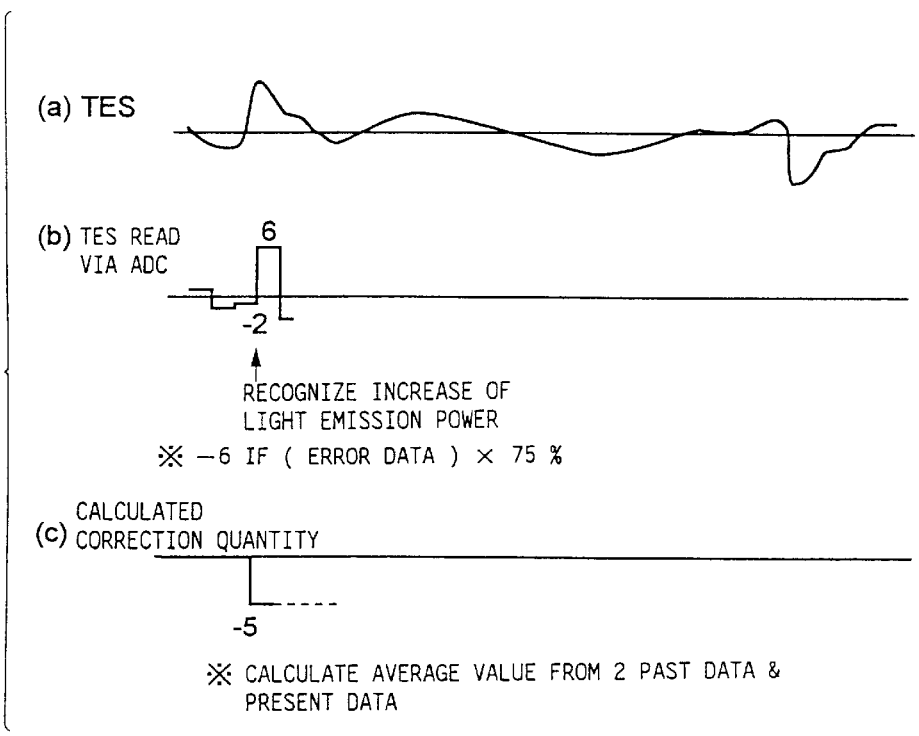
FIG. 30 is a diagram for explaining the operation of the tenth embodiment of the tracking control method.

Next, a description will be given of a tenth embodiment of the tracking control method according to the present invention, by referring to FIGS. 29 and 30. FIG. 29 is a flow chart for explaining this tenth embodiment of the tracking control method, and shows a process carried out by the DSP 16. In FIG. 29, those steps which are the same as those corresponding parts in FIG. 27 are designated by the same reference numerals, and a description thereof will be omitted. FIG. 30 is a diagram for explaining the operation of this tenth embodiment of the tracking control method.

In this embodiment, the correction quantity calculating part 202 calculates an error between the TES which is sampled when the change in the light emission power is detected and the TES which is sampled immediately before, and calculates a data that is obtained by multiplying a constant to the calculated error. In addition, the correction quantity calculating part 202 stores a plurality of such data, and uses an average value of the stored errors as the correction quantity. In FIG. 29, steps S50, S55 and S51-1 through S54-1 are carried out in the correction quantity calculating part 202. The step S55 multiplies a constant to the error which is calculated in the step S51. The step S51-1 loads a plurality of past multiplication results which are stored, and the step S52-1 calculates an average value of the present calculated multiplication result and the plurality of past multiplication results which are stored. The step S53-1 stores the calculated average value as the correction quantity. The step S54-1 updates the past multiplication results so as to include the present multiplication result.

In FIG. 30, (a) shows the TES before the correction is carried out depending on the change in the light emission power, (b) shows the TES which is read via the ADC 161, and (c) shows the correction quantity which is calculated in this case. As shown in FIG. 30, when the increase of the light emission power is detected, and the sampled TES is "6" and the TES which is sampled immediately before is "−2", an error "−8(=−2−6)" is calculated. If the constant is "75%", a multiplication result of the above error and the constant is "−6(=−8·75%)". Hence, if a previously stored past multiplication result is "−4" and a last but one stored past multiplication result is "−5", for example, an average value of the present multiplication result and the past multiplication results is "−5(=(−6−4−5)/3)", and this average value "−5" is stored as the correction quantity. In addition, the stored past multiplication results "−41" and "−5" are updated to "−5" and "−4" so as to include the present multiplication result "−5".

A process similar to that described above in conjunction with the ninth embodiment may be carried out if no past multiplication results exist.

Figure 31:
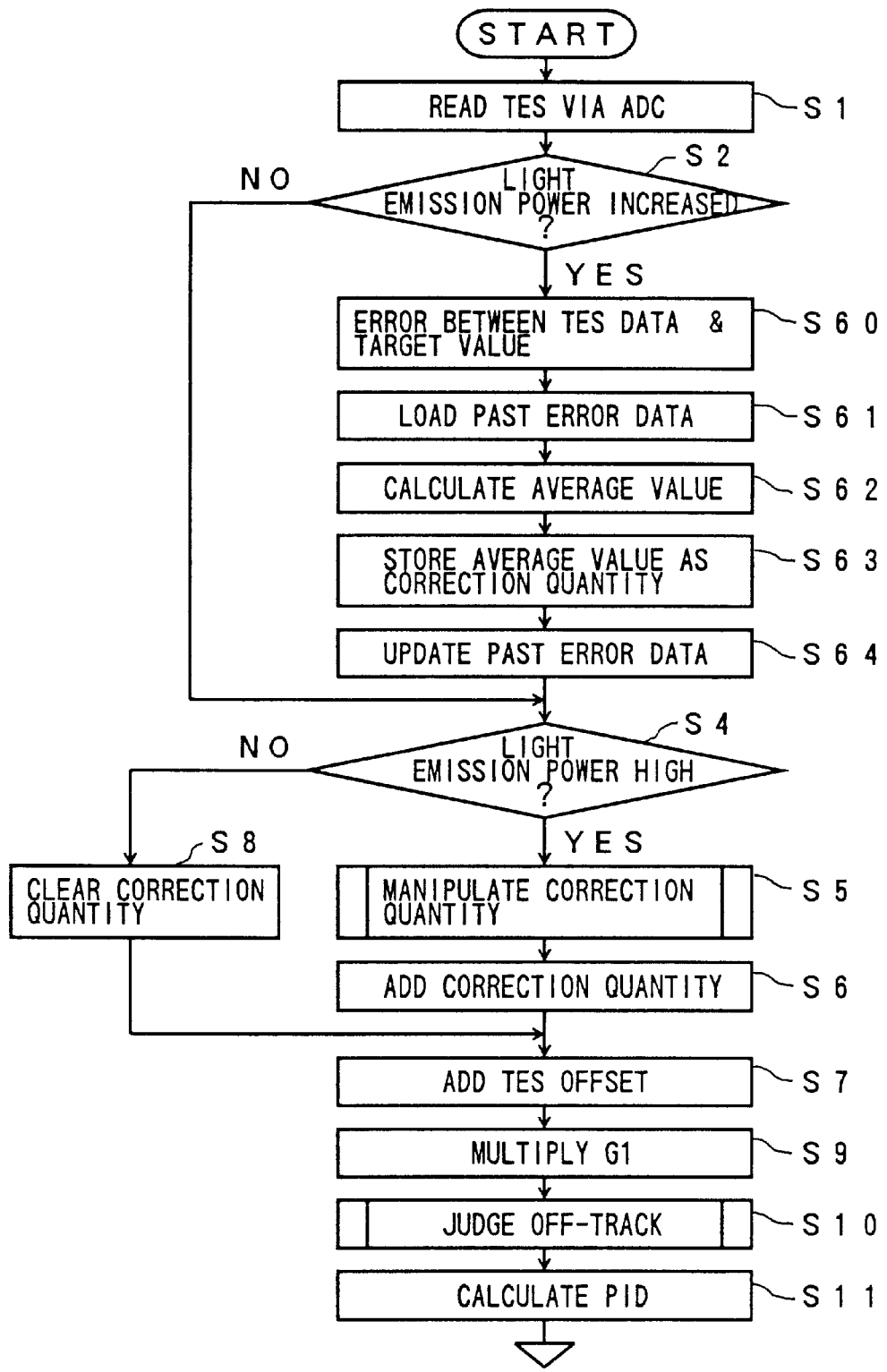
FIG. 31 is a flow chart for explaining an eleventh embodiment of the tracking control method according to the present invention.
Figure 32:
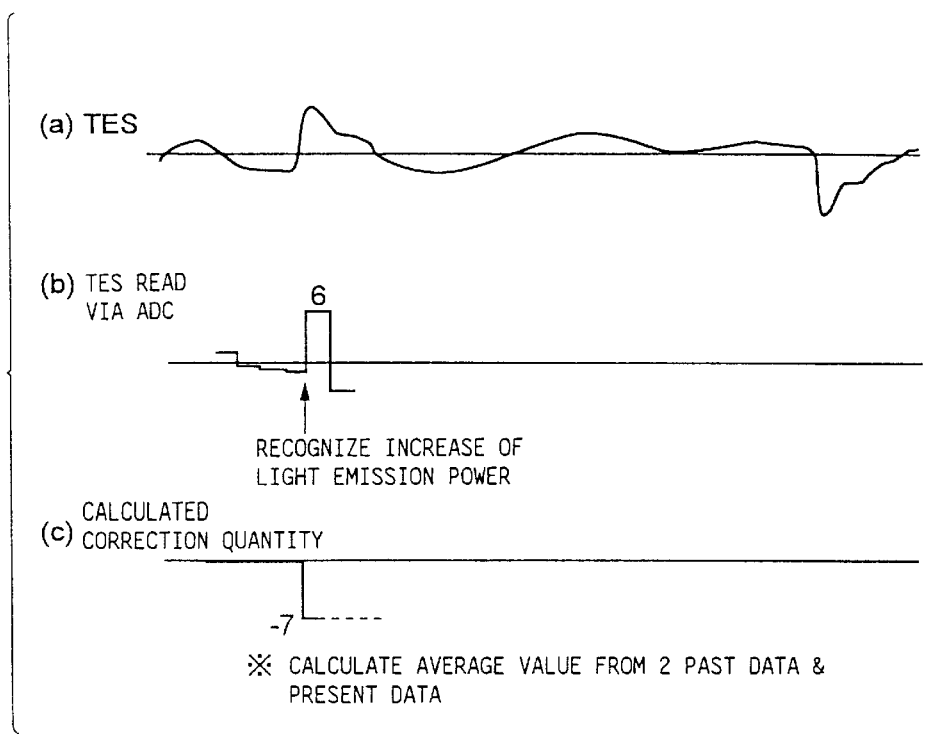
FIG. 32 is a diagram for explaining the operation of the eleventh embodiment of the tracking control method.

Next, a description will be given of an eleventh embodiment of the tracking control method according to the present invention, by referring to FIGS. 31 and 32. FIG. 31 is a flow chart for explaining this eleventh embodiment of the tracking control method, and shows a process carried out by the DSP 16. In FIG. 31, those steps which are the same as those corresponding parts in FIG. 10 are designated by the same reference numerals, and a description thereof will be omitted. FIG. 32 is a diagram for explaining the operation of this eleventh embodiment of the tracking control method.

In this embodiment, steps S60 through S64 are carried out in the correction quantity calculating part 202. The step S60 calculates an error between the TES which is sampled when the change in the light emission power is detected and a tracking control target value. For example, the tracking control target value is "0". The step S61 loads a plurality of past errors which are calculated and stored. The step S62 calculates an average value of the present calculated error and the plurality of past errors which are loaded. The step S63 stores the average value which is calculated in the step S62 as the correction quantity. The step S64 updates the past errors so as to include the present error.

In FIG. 32, (a) shows the TES before the correction is carried out depending on the change in the light emission power, (b) shows the TES which is read via the ADC 161, and (c) shows the correction quantity which is calculated in this case. As shown in FIG. 32, when the increase of the light emission power is detected, and the sampled TES is "6" and the tracking control target value is "0", an error "−6(=0−6)" is calculated. If a previously stored error is "−8" and a last but one stored error is "−7", for example, an average value of the present error and the past errors is "−7(=(−6−8−7)/3)", and this average value "−7" is stored as the correction quantity. In addition, the past errors "−8" and "−7" which are stored are updated to "−6" and "−8" so as to include the present error "−6".

A process similar to that described above in conjunction with the ninth embodiment may be carried out if no past multiplication results exist.

Figure 33:
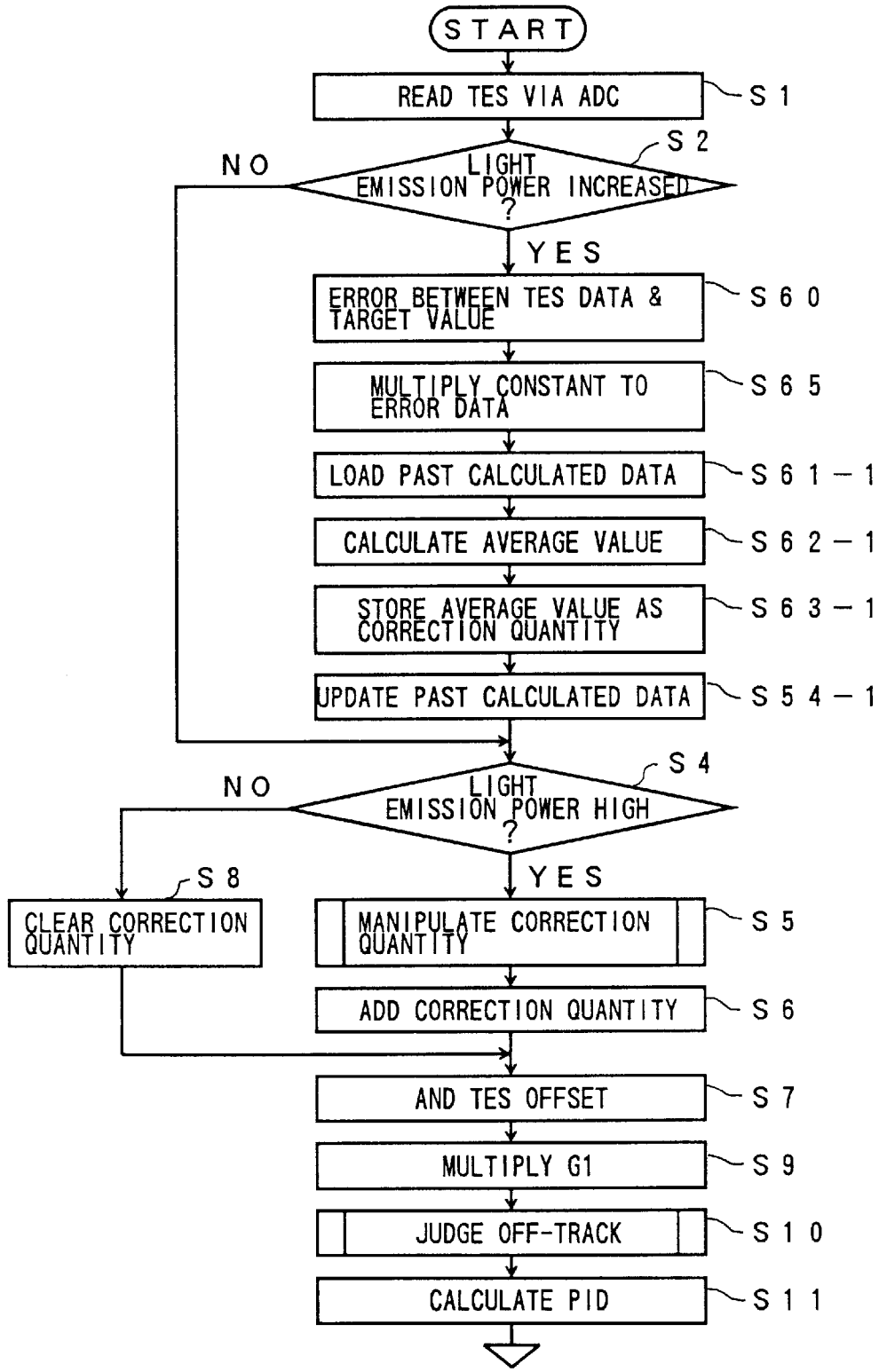
FIG. 33 is a flow chart for explaining a twelfth embodiment of the tracking control method according to the present invention.
Figure 34:
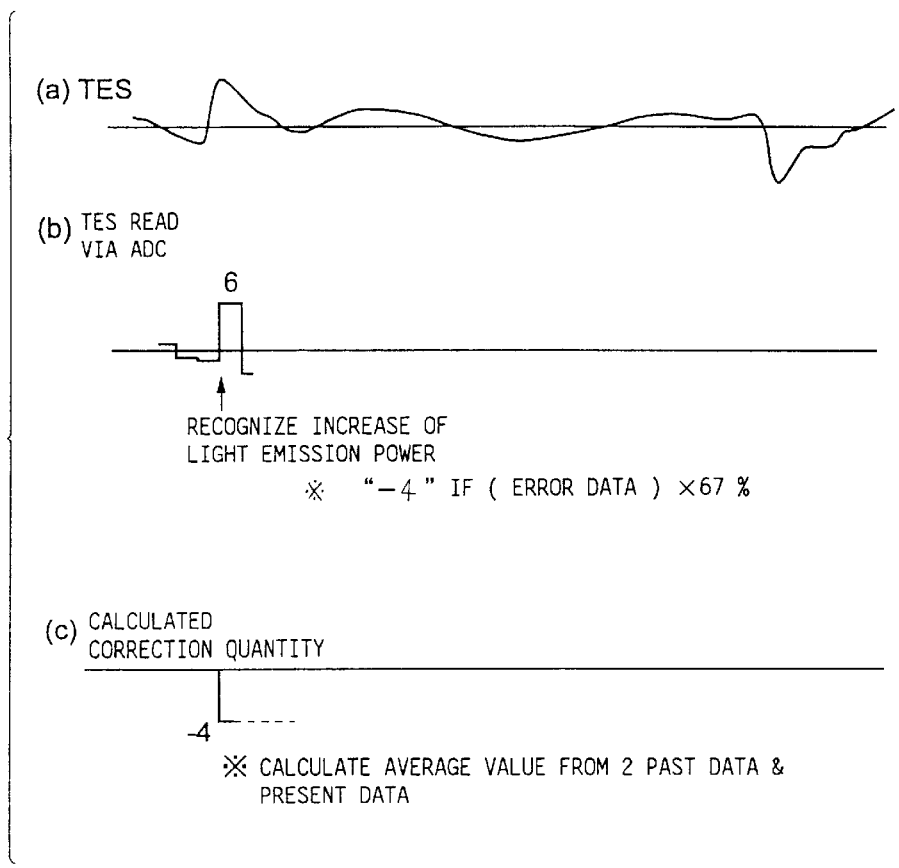
FIG. 34 is a diagram for explaining the operation of the twelfth embodiment of the tracking control method.

Next, a description will be given of a twelfth embodiment of the tracking control method according to the present invention, by referring to FIGS. 33 and 34. FIG. 33 is a flow chart for explaining this twelfth embodiment of the tracking control method, and shows a process carried out by the DSP 16. In FIG. 33, those steps which are the same as those corresponding parts in FIG. 31 are designated by the same reference numerals, and a description thereof will be omitted. FIG. 34 is a diagram for explaining the operation of this twelfth embodiment of the tracking control method.

In this embodiment, steps S60, S65 and S61-1 through S64-1 are carried out by the correction quantity calculating part 202. The step S60 calculates an error between the TES which is sampled when the change in the light emission power is detected and a tracking control target value. For example, the tracking control target value is "0". The step S65 multiplies a constant to the error which is calculated in the step S60. The step S61-1 loads a plurality of multiplication results which are calculated in the past and stored. The step S62-1 calculates an average value of a present calculated multiplication result and the plurality of multiplication results which are loaded. The step S63-1 stores the average value which is calculated in the step S62-1 as the correction quantity. The step S64-1 updates the past multiplication results so as to include the present multiplication result.

In FIG. 34, (a) shows the TES before the correction is carried out depending on the change in the light emission power, (b) shows the TES which is read via the ADC 161, and (c) shows the correction quantity which is calculated in this case. As shown in FIG. 34, when the increase of the light emission power is detected, and the sampled TES is "6" and the tracking control target value is "0", an error "−6(=0−6)" is calculated. In addition, if the constant is "67%", a multiplication result which is calculated by multiplying this constant to the above described error is "−4(=−6·67%)". If a previously stored multiplication result is "−3" and a last but one stored multiplication result is "−5", for example, an average value of the present multiplication result and the past multiplication results is "−4(=(−4−3−5)/3)", and this average value "−4" is stored as the correction quantity. In addition, the past multiplication results "−3" and "−5" which are stored are updated to "−4" and "−3" so as to include the present error "−4".

A process similar to that described above in conjunction with the ninth embodiment may be carried out if no past multiplication results exist.

Figure 35:
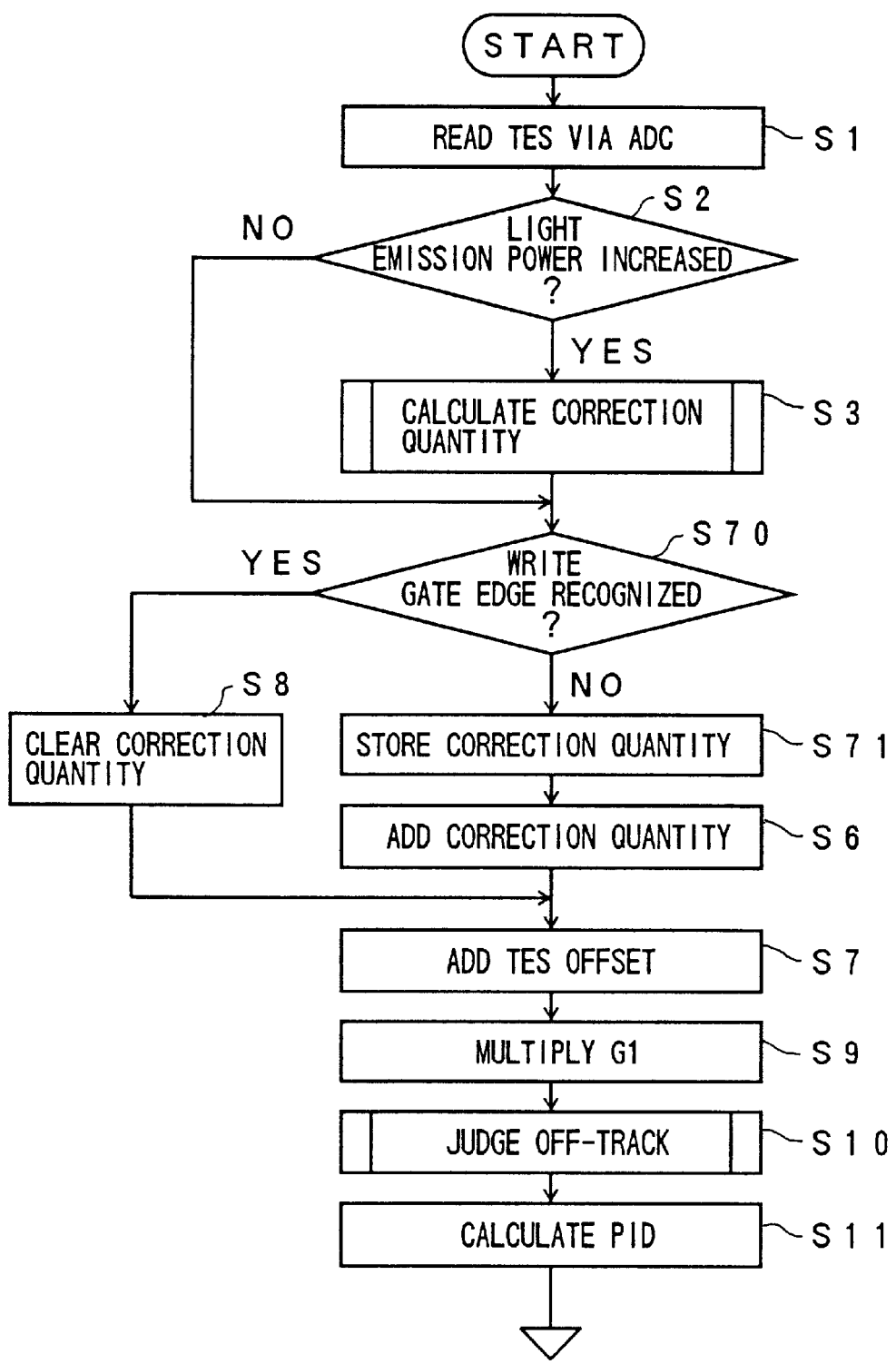
FIG. 35 is a flow chart for explaining a thirteenth embodiment of the tracking control method according to the present invention.
Figure 36:
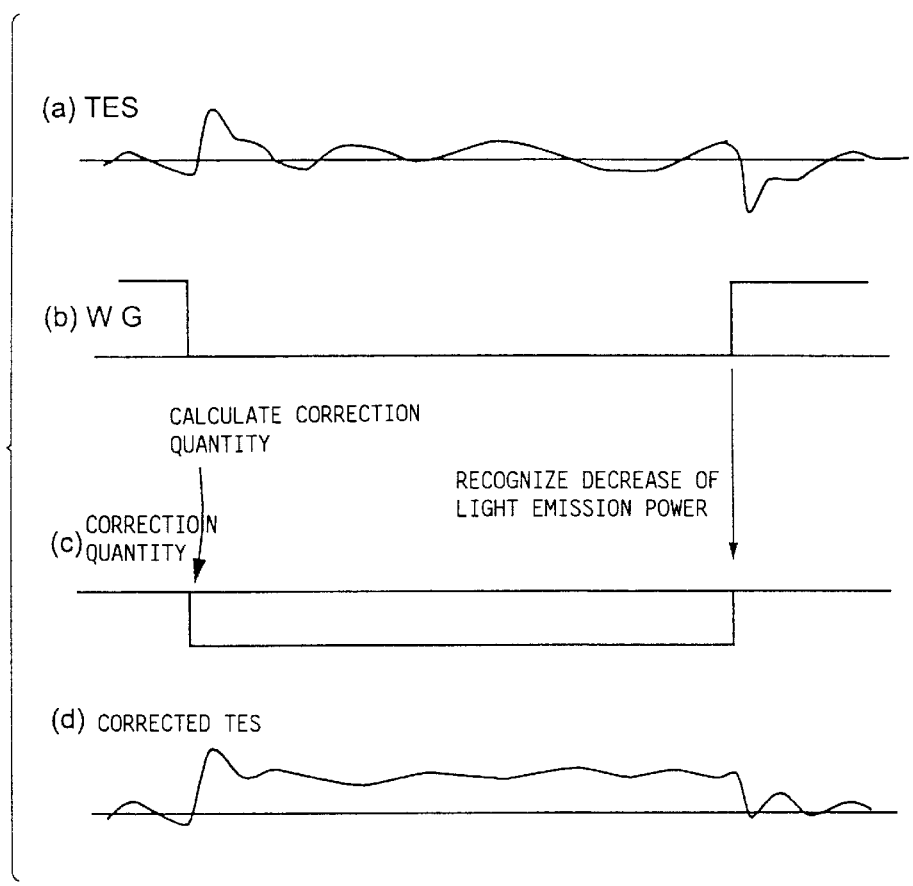
FIG. 36 is a diagram for explaining the operation of the thirteenth embodiment of the tracking control method.

Next, a description will be given of a thirteenth embodiment of the tracking control method according to the present invention, by referring to FIGS. 35 and 36. FIG. 35 is a flow chart for explaining this thirteenth embodiment of the tracking control method, and shows a process carried out by the DSP 16. In FIG. 35, those steps which are the same as those corresponding parts in FIG. 10 are designated by the same reference numerals, and a description thereof will be omitted. FIG. 36 is a diagram for explaining the operation of this thirteenth embodiment of the tracking control method.

In FIG. 35, a step S70 decides, in the light emission power detecting part 201, whether or not a rising edge of the write gate signal WG is recognized. The process advances to the step S8 if the decision result in the step S70 is YES. On the other hand, if the decision result in the step S70 is NO, a step S71 stores the correction quantity calculated in the step S3, in the correction quantity manipulating part 203, and the process advances to the step S6. As a result, the storage and addition of the correction quantity which is obtained when the light emission power increases, are continued until the rising edge of the write gate signal WG is recognized.

In FIG. 36, (a) shows the TES before the correction is carried out depending on the change in the light emission power, (b) shows the write gate signal WG, (c) shows the correction quantity which is calculated in this case, and (d) shows the TES which is corrected by the correction quantity show in (c). As shown in FIG. 36 (d), the TES is in an offset stage while the correction quantity is stored.

Figure 37:
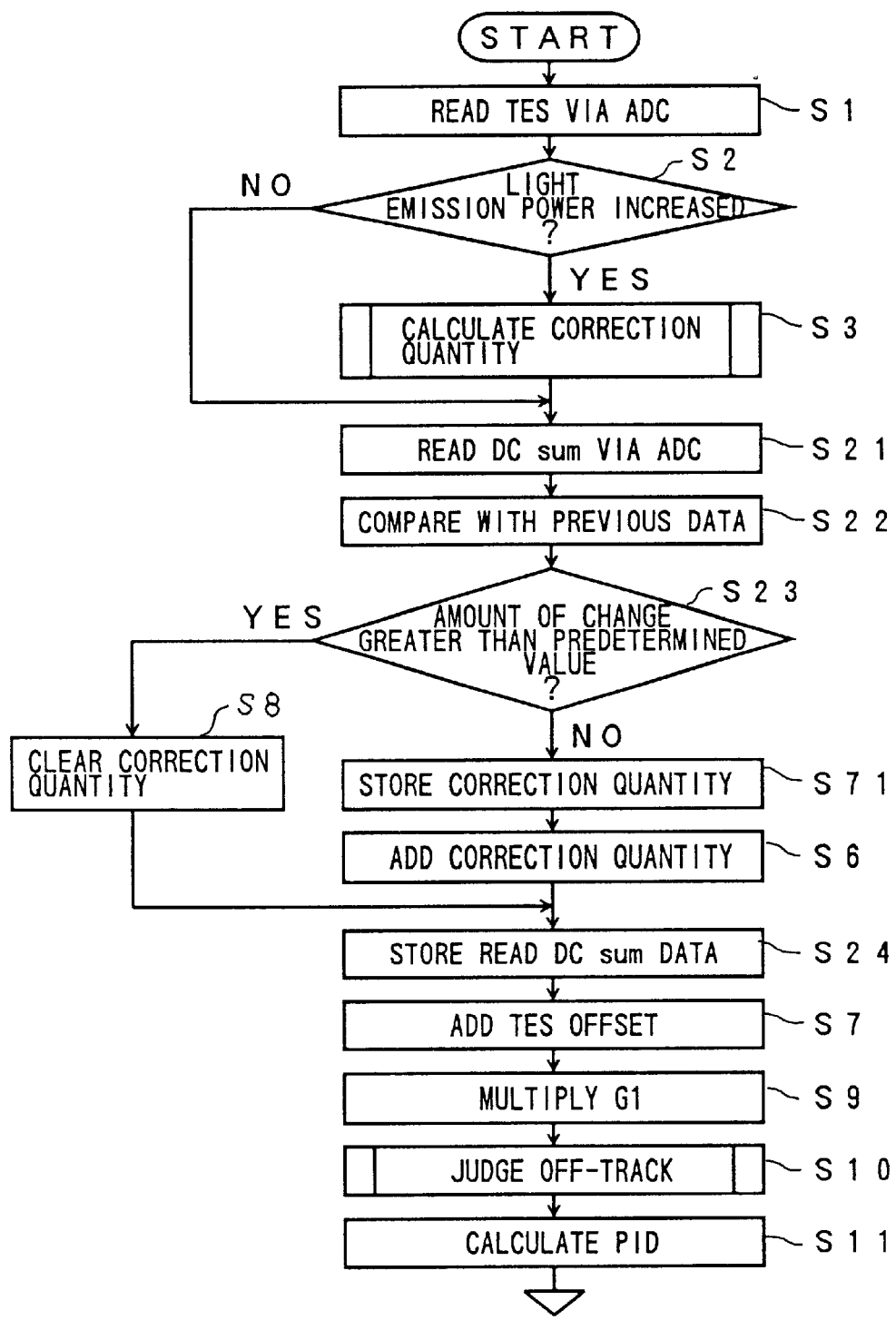
FIG. 37 is a flow chart for explaining a fourteenth embodiment of the tracking control method according to the present invention.
Figure 38:
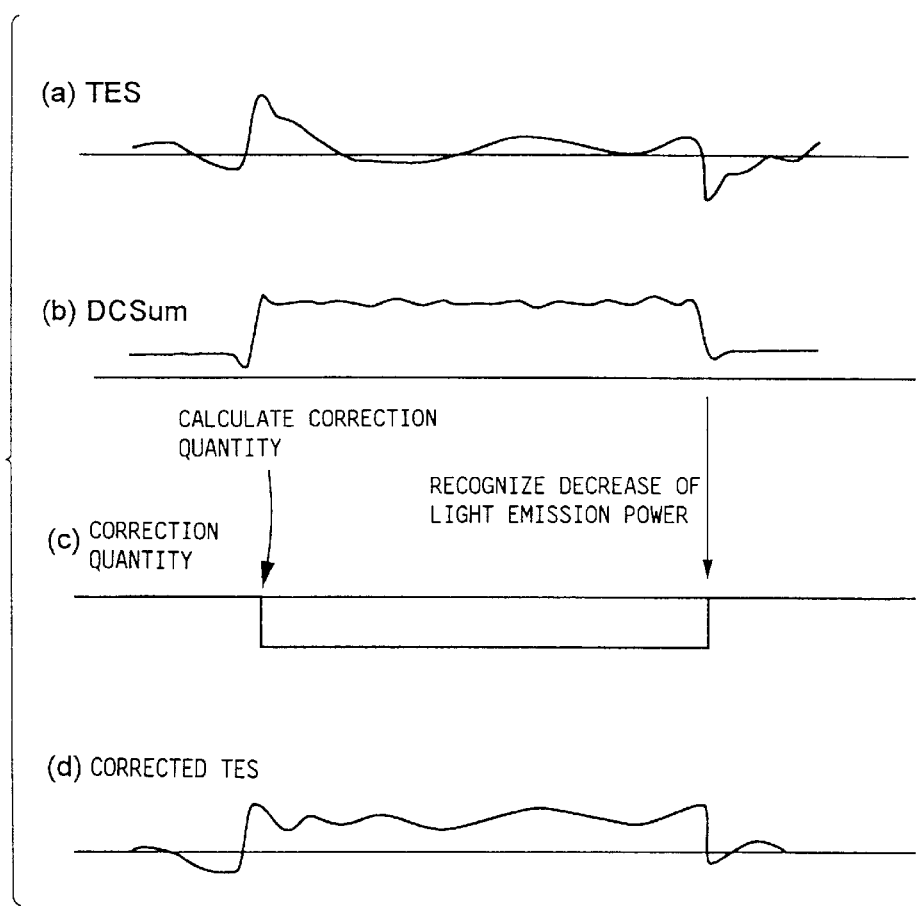
FIG. 38 is a diagram for explaining the operation of the fourteenth embodiment of the tracking control method.

Next, a description will be given of a fourteenth embodiment of the tracking control method according to the present invention, by referring to FIGS. 37 and 38. FIG. 37 is a flow chart for explaining this fourteenth embodiment of the tracking control method, and shows a process carried out by the DSP 16. In FIG. 37, those steps which are the same as those corresponding parts in FIG. 15 are designated by the same reference numerals, and a description thereof will be omitted. FIG. 38 is a diagram for explaining the operation of this fourteenth embodiment of the tracking control method.

In FIG. 37, the process advances to the step S8 if the decision result in the step S23 is YES. On the other hand, if the decision result in the step S23 is NO, the step S71 stores the calculated correction quantity in the correction quantity manipulating part 203, and the process advances to the step S6. Accordingly, the storage and addition of the correction quantity are continued until the amount of change of the DC sum signal exceeds the predetermined value, and the correction quantity is cleared when the amount of change of the DC sum signal exceeds the predetermined value.

In FIG. 38, (a) shows the TES before the correction is carried out depending on the change in the light emission power, (b) shows the DC sum signal, (c) shows the correction quantity which is calculated in this case, and (d) shows the TES which is corrected by the correction quantity shown in (c). As shown in FIG. 38 (d), the TES is in an offset state while the correction quantity is stored.

Figure 39:
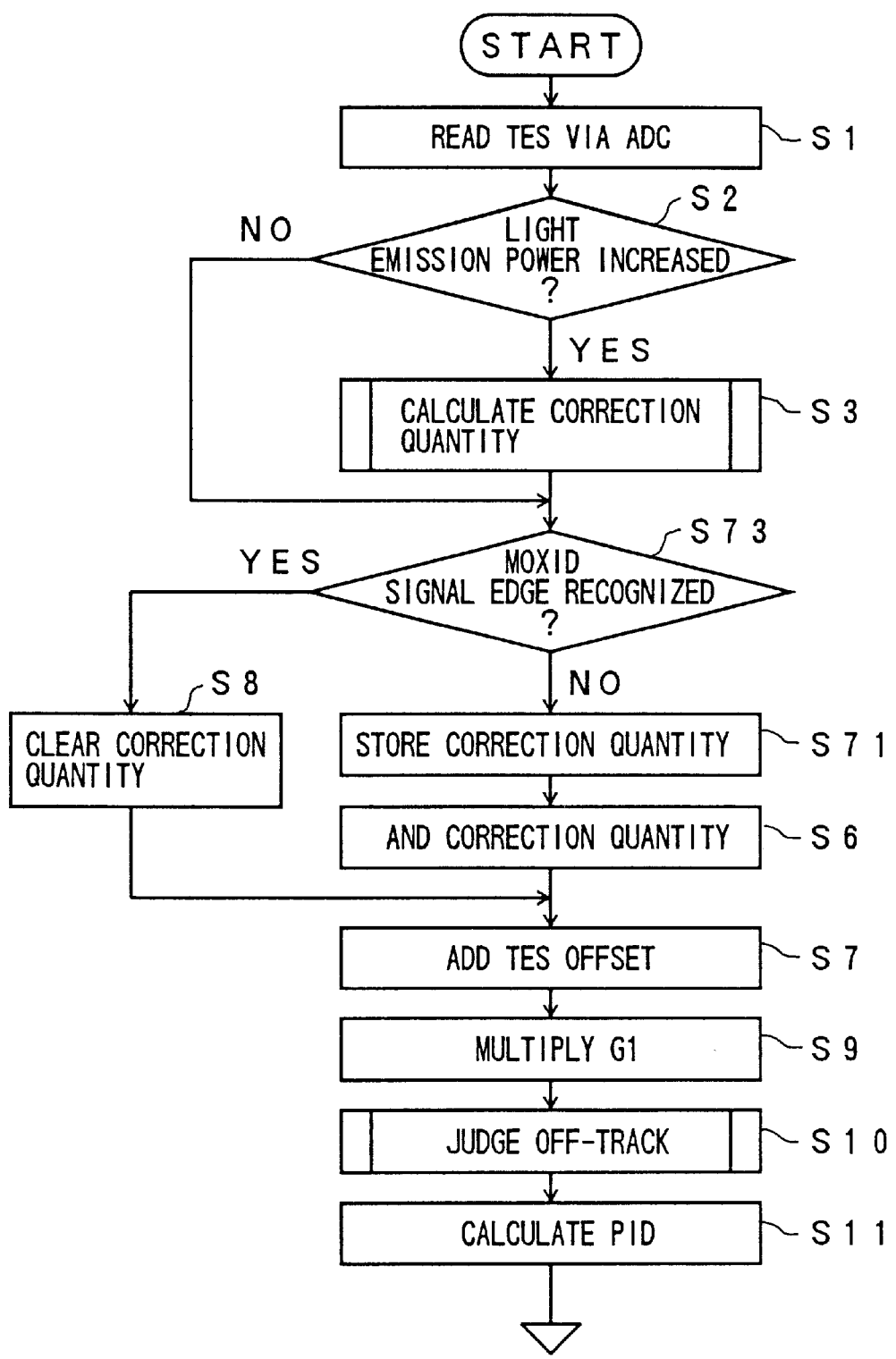
FIG. 39 is a flow chart for explaining a fifteenth embodiment of the tracking control method according to the present invention.
Figure 40:
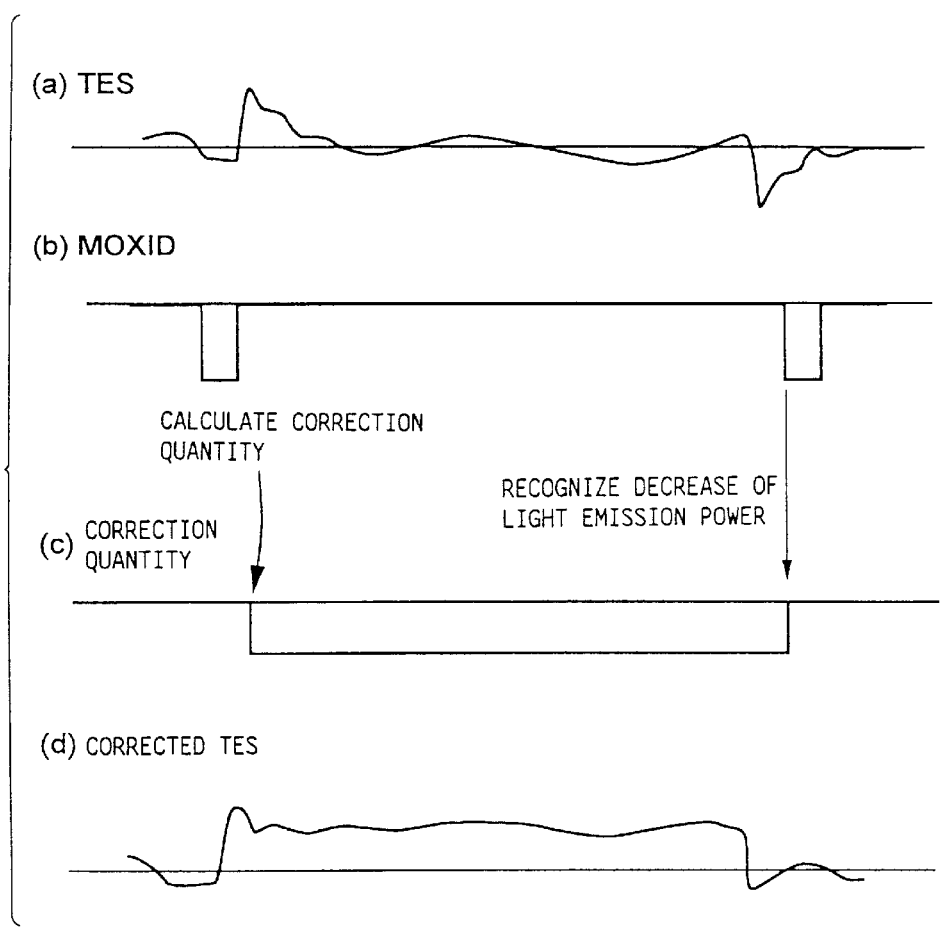
FIG. 40 is a diagram for explaining the operation of the fifteenth embodiment of the tracking control method.

Next, a description will be given of a fifteenth embodiment of the tracking control method according to the present invention, by referring to FIGS. 39 and 40. FIG. 39 is a flow chart for explaining this fifteenth embodiment of the tracking control method, and shows a process carried out by the DSP 16. In FIG. 39, those steps which are the same as those corresponding parts in FIGS. 10 and 35 are designated by the same reference numerals, and a description thereof will be omitted. FIG. 40 is a diagram for explaining the operation of this fifteenth embodiment of the tracking control method.

In FIG. 39, a step S73 decides, in the light emission power detecting part 201, whether or not a falling edge of the MOXID signal obtained via the edge port 172 is recognized. The process advances to the step S8 if the decision result in the step S73 is YES. On the other hand, if the decision result in the step S73 is NO, the step S72 stores the correction quantity in the correction quantity manipulating part 203, and the process advances to the step S6. Hence, the storage and addition of the correction quantity are continued until the falling edge of the MOXID signal is recognized, and the correction quantity is cleared at the time when the falling edge of the MOXID signal is recognized.

In FIG. 40, (a) shows the TES before the correction is carried out depending on the change in the light emission power, (b) shows the MOXID signal, (c) shows the correction quantity which is calculated in this case, and (d) shows the TES which is corrected by the correction quantity shown in (c). As shown in FIG. 40 (d), the TES is in an offset state while the correction quantity is stored.

Figure 41:
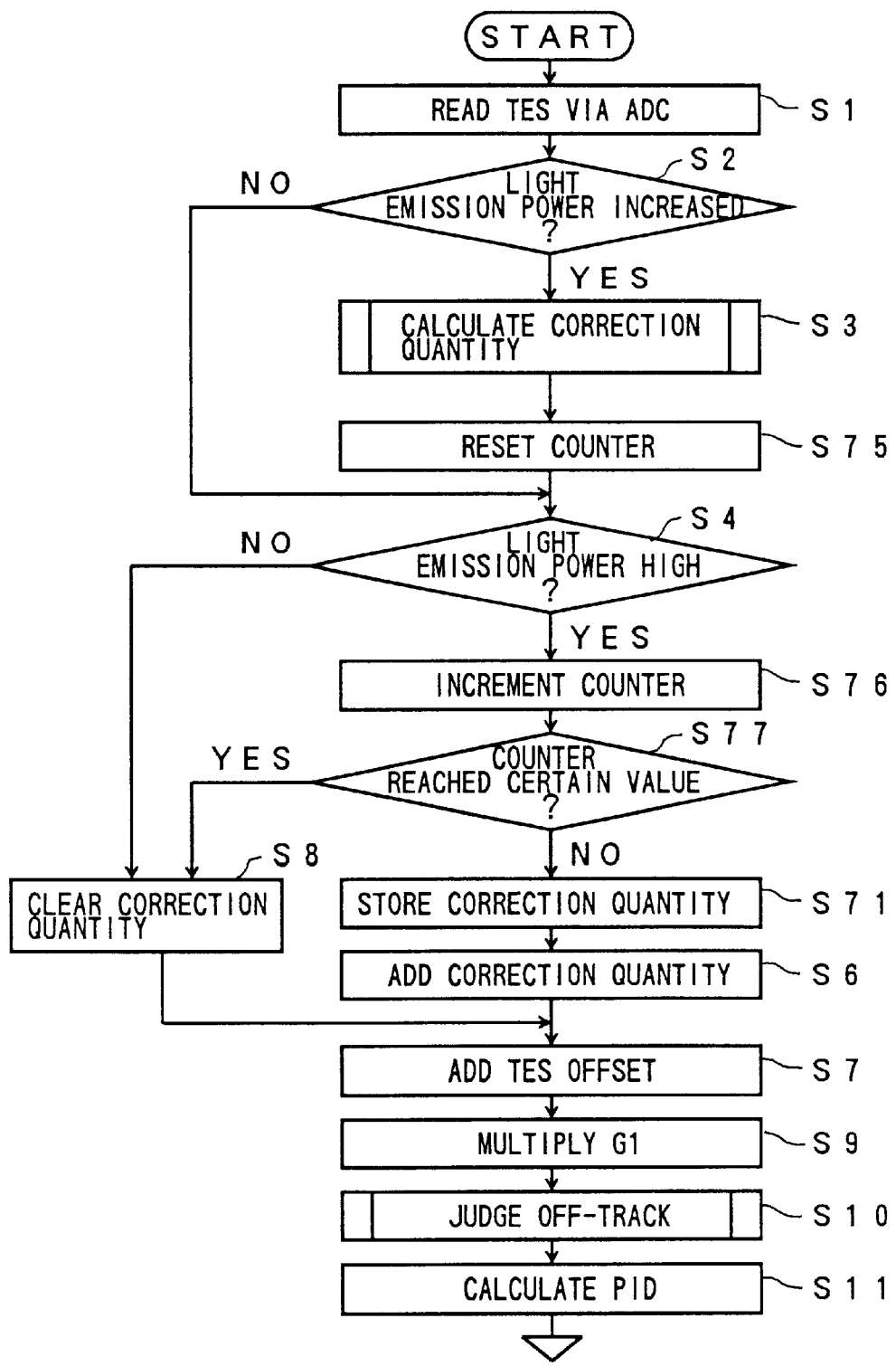
FIG. 41 is a flow chart for explaining a sixteenth embodiment of the tracking control method according to the present invention.
Figure 42:
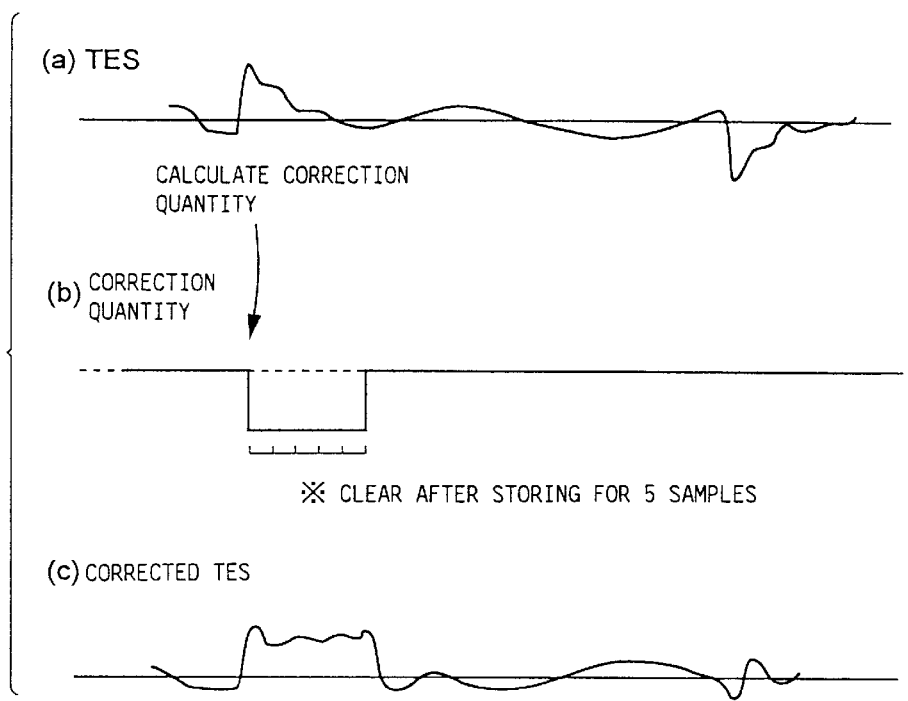
FIG. 42 is a diagram for explaining the operation of the sixteenth embodiment of the tracking control method.

Next, a description will be given of a sixteenth embodiment of the tracking control method according to the present invention, by referring to FIGS. 41 and 42. FIG. 41 is a flow chart for explaining this sixteenth embodiment of the tracking control method, and shows a process carried out by the DSP 16. In FIG. 41, those steps which are the same as those corresponding parts in FIGS. 10 and 35 are designated by the same reference numerals, and a description thereof will be omitted. FIG. 42 is a diagram for explaining the operation of this sixteenth embodiment of the tracking control method.

In FIG. 41, steps S75 through S77 are carried out by the correction quantity manipulating part 203. The step S75 resets a counter within the DSP 16, and the process advances to the step S8 if the decision result in the step S4 is NO. On the other hand, if the decision result in the step S4 is YES, the step S76 increments the value of the counter by 1. In addition, the step S77 decides whether or not the value of the counter reached a certain value indicating a certain number of samples. The process advances to the step S8 if the decision result in the step S77 is YES. If the decision result in the step S77 is NO, the process advances to the step S71, and the correction quantity is stored. Accordingly, when the light emission power increases and the correction quantity is calculated, the counter is reset and the value of the counter is incremented every time the light emission power is high. The storage and addition of the correction quantity are continued until the value of the counter reaches the certain value, and the correction quantity is cleared at the time when the value of the counter reaches the certain value.

In FIG. 42, (a) shows the TES before the correction is carried out depending on the change in the light emission power, (b) shows the correction quantity which is calculated in this case, and (c) shows the TES which is corrected by the correction quantity shown in (b). As shown in FIG. 42(c), the TES is in an offset state while the correction quantity is stored, that is, during a time of 5 samples in this particular case. Therefore, this embodiment is effective particularly in a case where it is desirable to suppress an excessive response which is caused by the TES fluctuation when the light emission power changes.

Figure 43:
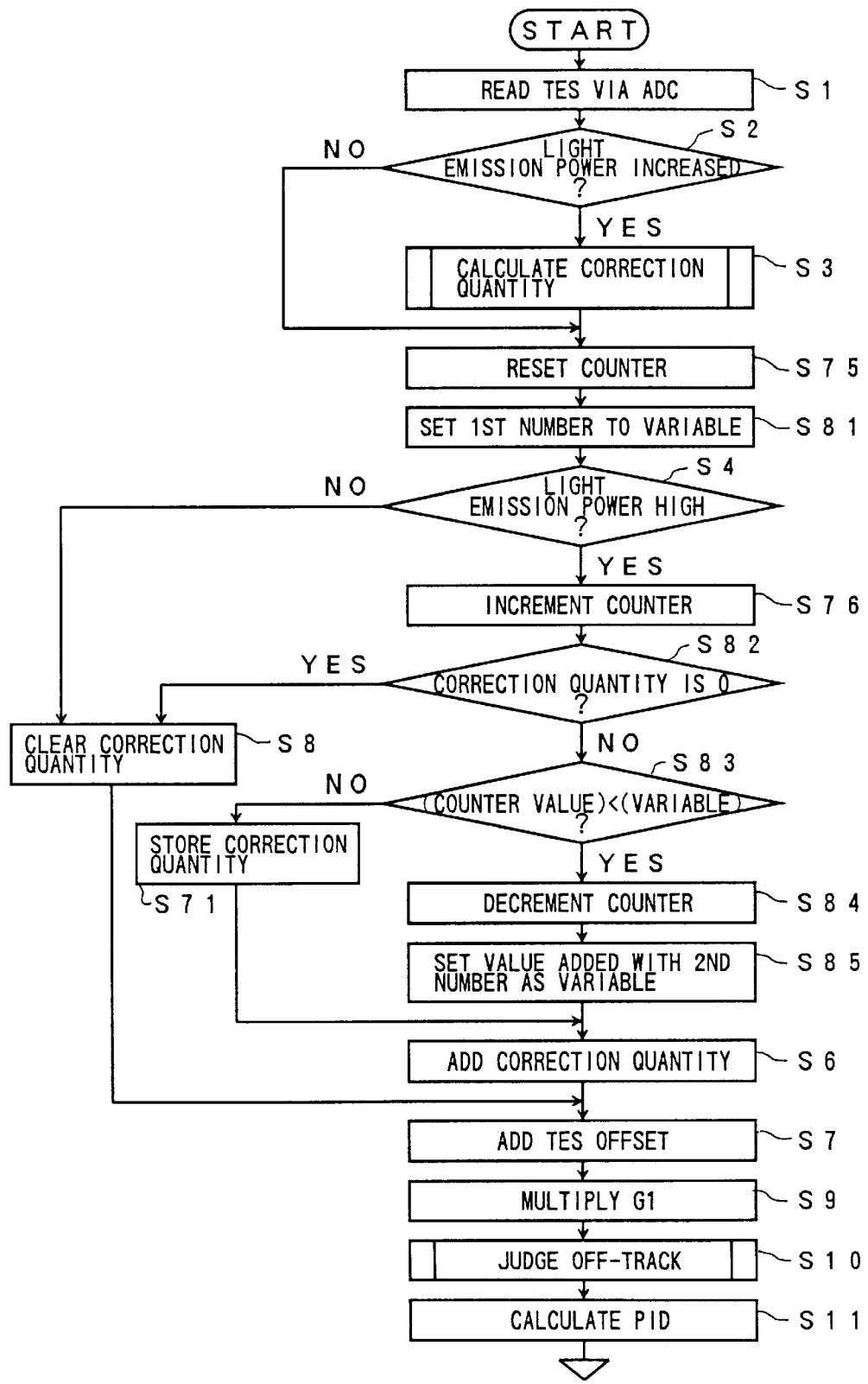
FIG. 43 is a flow chart for explaining a seventeenth embodiment of the tracking control method according to the present invention.
Figure 44:
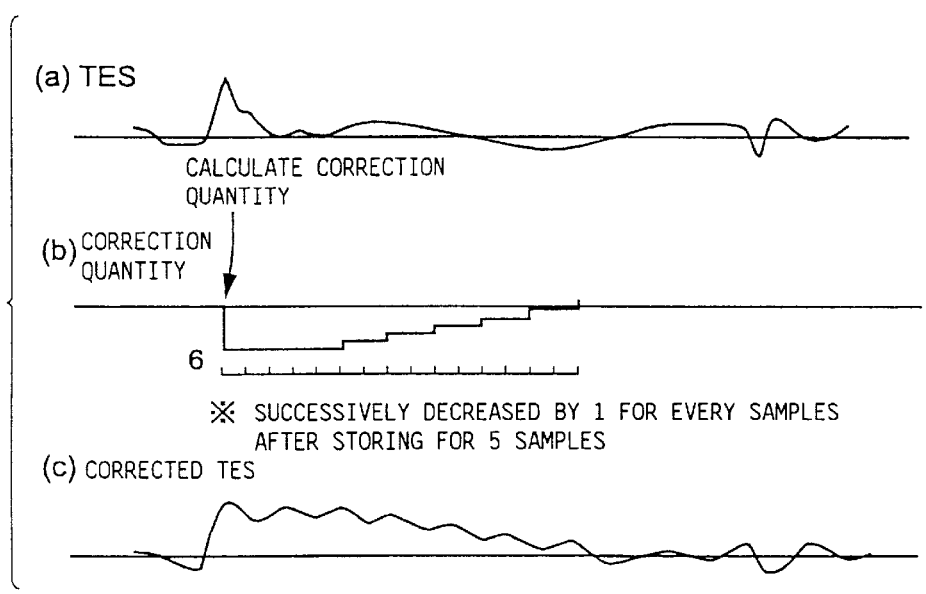
FIG. 44 is a diagram for explaining the operation of the seventeenth embodiment of the tracking control method.

Next, a description will be given of a seventeenth embodiment of the tracking control method according to the present invention, by referring to FIGS. 43 and 44. FIG. 43 is a flow chart for explaining this seventeenth embodiment of the tracking control method, and shows a process carried out by the DSP 16. In FIG. 43, those steps which are the same as those corresponding parts in FIGS. 10 and 41 are designated by the same reference numerals, and a description thereof will be omitted. FIG. 44 is a diagram for explaining the operation of this seventeenth embodiment of the tracking control method.

In this embodiment, after the correction quantity which is calculated in the correction quantity calculating part 202 is stored and added during a time corresponding to the certain number of samples in the correction quantity manipulating part 203, the correction quantity which is added is gradually decreased until the correction quantity becomes "0".

In FIG. 43, steps S81 through S85 are carried out in the correction quantity manipulating part 203. When the counter is reset in a step S75, the step S81 sets a first certain number which indicates the stored number of samples to a variable, and the process advances to the step S4. If the decision result in the step S4 is YES, a step S76 increments the counter by 1, and the step S82 decides whether or not the correction quantity is "0". If the decision result in the step S82 is YES, the process advances to the step S8, and the correction quantity is cleared.

On the other hand, if the decision result in the step S82 is NO, the step S83 decides whether or not the value of the counter is smaller than the variable. If the decision result in the step S83 is NO, the process advances to the step S6 after storing the correction quantity in the step S71. If the decision result in the step S83 is YES, the step S84 decrements the correction quantity by 1. In addition, the step S85 sets a value which is obtained by adding to the number of samples a second certain value which indicates the correction quantity decrementing interval, as the variable. The step S6 adds the correction quantity to the TES.

In FIG. 44, (a) shows the TES before the correction is carried out depending on the change in the light emission power, (b) shows the correction quantity which is calculated in this case, and (c) shows the TES which is corrected by the correction quantity shown in (b). FIG. 44 shows a case where the first certain value is "5", the second certain value is "2", and the correction quantity which is calculated when the increase of the light emission power is recognized is "6". In this case, the correction quantity "6" is stored and added during the time of 5 samples. Thereafter, the correction quantity is successively decreased by 1 for every 2 sampling intervals, for a total of 10 sampling intervals. In addition, as shown in FIG. 44(c), the offset quantity of the TES decreases with the change in the correction quantity. Thus, this embodiment is particularly effective in a case where it is desirable to suppress an excessive response which is caused by the TES fluctuation when the light emission power changes.

In this embodiment, the correction quantity is successively decreased by "1" for the sake of convenience. However, the unit or value with which the correction quantity is successively decreased is of course not limited to "1".

Figure 45:
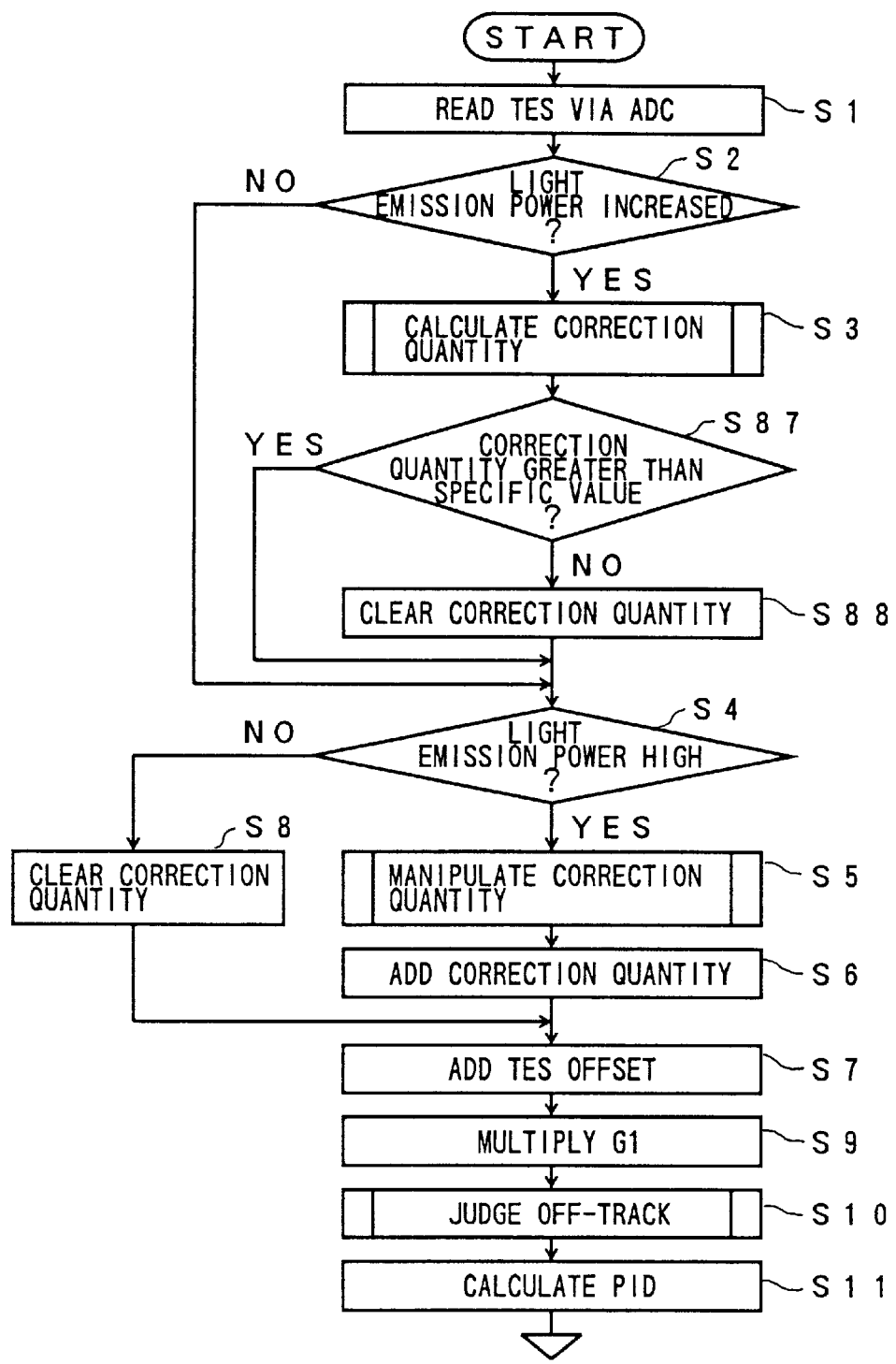
FIG. 45 is a flow chart for explaining an eighteenth embodiment of the tracking control method according to the present invention.
Figure 46:
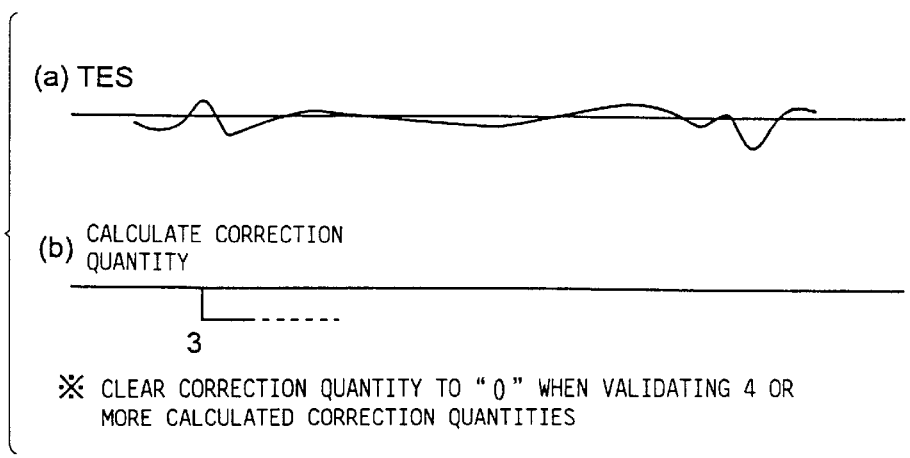
FIG. 46 is a diagram for explaining the operation of the eighteenth embodiment of the tracking control method.

Next, a description will be given of an eighteenth embodiment of the tracking control method according to the present invention, by referring to FIGS. 45 and 46. FIG. 45 is a flow chart for explaining this eighteenth embodiment of the tracking control method, and shows a process carried out by the DSP 16. In FIG. 45, those steps which are the same as those corresponding parts in FIG. 10 are designated by the same reference numerals, and a description thereof will be omitted. FIG. 46 is a diagram for explaining the operation of this eighteenth embodiment of the tracking control method.

In this embodiment, when an absolute value of the calculated correction quantity is smaller than a specific value, this calculated correction quantity is invalidated. In FIG. 45, steps S87 and S88 are carried out in the correction quantity manipulating part 203. After the correction quantity is calculated in the step S3, the step S87 decides whether or not an absolute value of the correction quantity is greater than a specific value. The process advances to the step S4 if the decision result in the step S87 is YES. On the other hand, if the decision result in the step S87 is NO, the step S88 clears the correction quantity, and the process advances to the step S4.

In FIG. 46, (a) shows the TES before the correction is carried out depending on the change in the light emission power, and (b) shows the correction quantity which is calculated in this case. FIG. 46 shows a case where the specific value is "4" and the calculated correction quantity is "3". Hence, in this particular case, the correction quantity is cleared to "0". In this embodiment, both the correction quantity and the specific value are described in absolute values.

Figure 47:
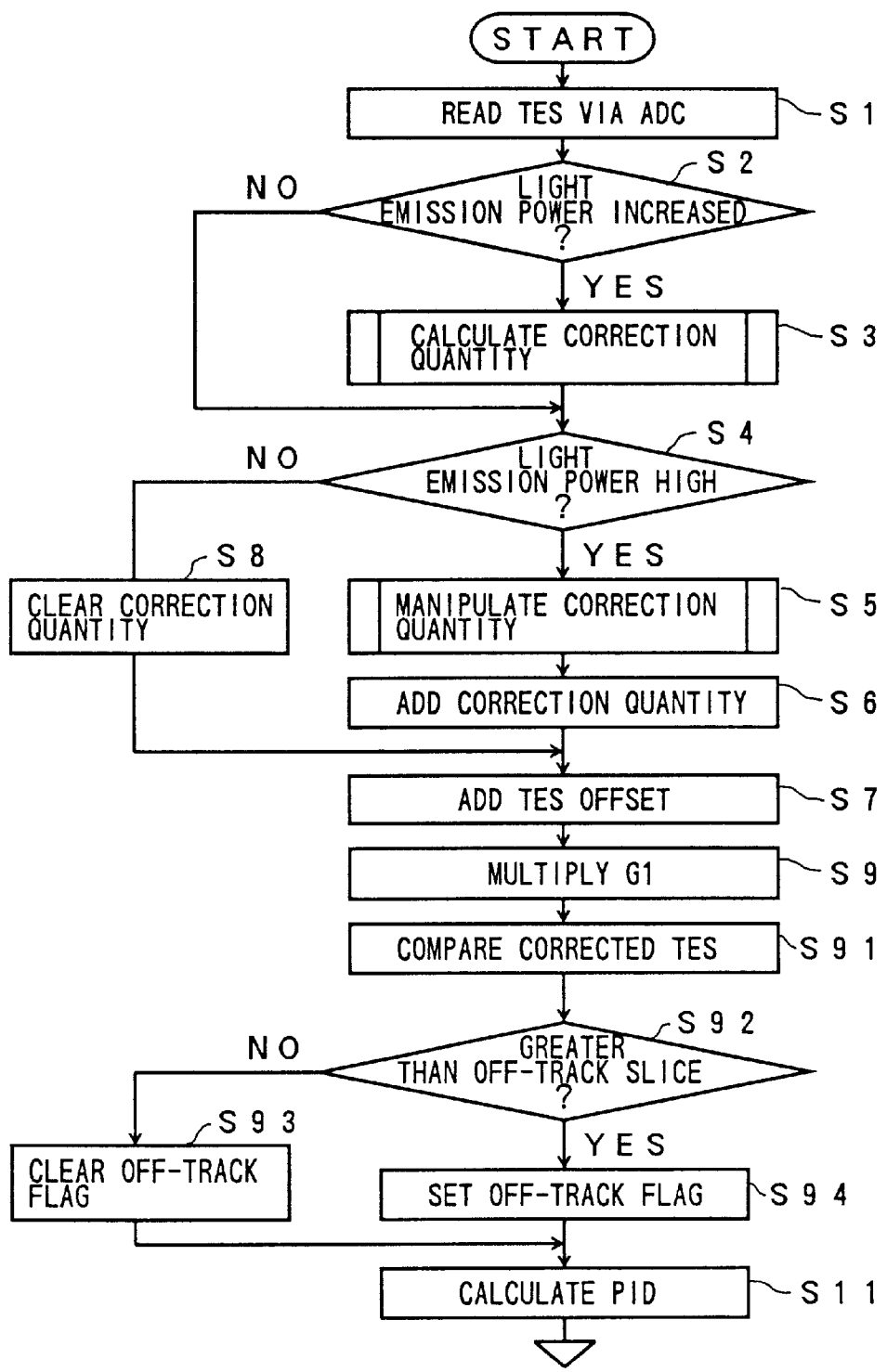
FIG. 47 is a flow chart for explaining a nineteenth embodiment of the tracking control method according to the present invention.
Figure 48:
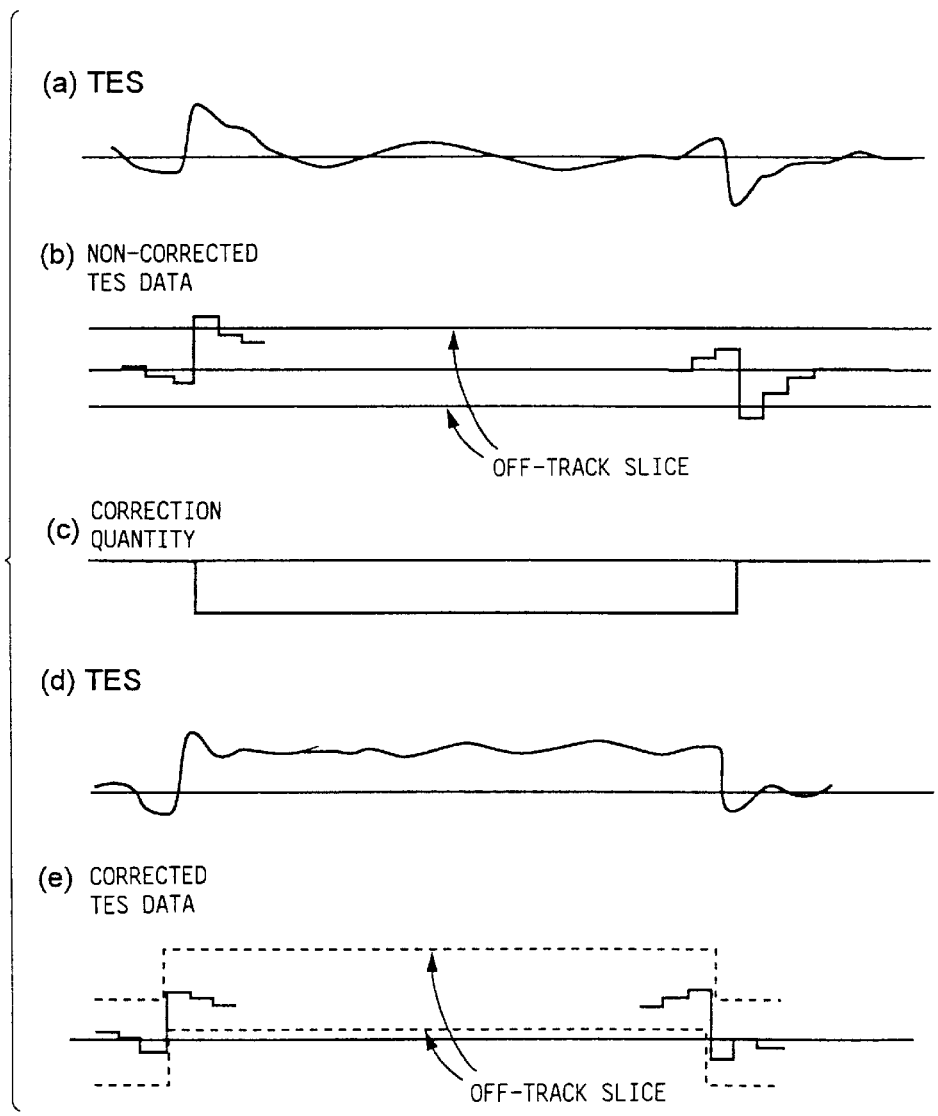
FIG. 48 is a diagram for explaining the operation of the nineteenth embodiment of the tracking control method.

Next, a description will be given of a nineteenth embodiment of the tracking control method according to the present invention, by referring to FIGS. 47 and 48. FIG. 47 is a flow chart for explaining this nineteenth embodiment of the tracking control method, and shows a process carried out by the DSP 16. In FIG. 47, those steps which are the same as those corresponding parts in FIG. 10 are designated by the same reference numerals, and a description thereof will be omitted. FIG. 48 is a diagram for explaining the operation of this nineteenth embodiment of the tracking control method.

In this embodiment, an off-track is detected by use of the corrected TES. In other words, the correction quantity which is added to the TES is similarly added to an off-track slice level.

In FIG. 47, steps S91 through S94 are carried out in the off-track judging part 164. After the step S9, the step S91 compares the corrected TES and the off-track slice level, and the step S92 decides whether or not the corrected TES is greater than the off-track slice level. If the decision result in the step S92 is NO, the step S93 clears an off-track flag, and the process advances to the step S11. On the other hand, if the decision result in the step S92 is YES, the step S94 sets the off-track flag, and the process advances to the step S11.

In FIG. 48, (a) shows the TES before the correction is carried out depending on the change in the light emission power, (b) shows the TES which is read via the ADC 161 in a case where no correction quantity is added to the TES and the TES is subjected to an offset addition and a gain multiplication, (c) shows the correction quantity which is calculated in this case, (d) shows the TES which is corrected by the correction quantity shown in (c), and (e) shows the TES which is obtained by subjecting the corrected TES shown in (d) to the offset addition and the gain multiplication. In FIG. 48 (b), the TES exceeds the off-track slice level due to the TES fluctuation during the write/erase process, and the off-track will be detected in this case. But according to this embodiment, the correction quantity added to the TES is similarly added to the off-track slice level. As a result, the off-track will not be detected in this embodiment, as shown in FIG. 38 (e). In this case, it is assumed that the correction quantity is constantly added during the time from the start to the end of the write/erase process. Hence, this embodiment can suppress particularly the excessive detection of the off-track caused by the TES fluctuation which occurs when the light emission power becomes large or the track servo system behaves unstably or uncontrollably, thereby making it possible to improve the write accuracy.

Further, the present invention is not limited to these embodiment, but various variations and modifications may be made without departing from the scope of the present invention.

What is claimed is:

1. A tracking control method for carrying out a tracking control based on a tracking error signal which indicates an error of a beam spot formed on a recording medium by a light beam from a light source with respect to a track comprising:

a detecting step detecting a change in a light emission power of the light source;

a calculating step calculating, based on the tracking error signal, a correction quantity which is used to correct a shift and/or fluctuation of the tracking error signal generated due to the change in the light emission power; and a correcting step carrying out a correction by adding the correction quantity to the tracking error signal when the change in the light emission power is detected by said detecting step.

2. The tracking control method as claimed in claim 1, which further comprises:

a step adding the correction quantity which is calculated by said calculating step also to an off-track slice level.

3. The tracking control method as claimed in claim 1, wherein said calculating step is carried out during the tracking control.

4. The tracking control method as claimed in claim 1, wherein said calculating step is carried out for every write/erase process.

5. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating, based on the tracking error signal, a correction quantity which is used to correct a shift and/or fluctuation of the tracking error signal generated due to the change in the light emission power; and a correcting section carrying out a correction by adding the correction quantity to the tracking error signal when the change in the light emission power is detected by said detecting section.

6. The storage unit as claimed in claim 5, wherein said detecting section detects the change in the light emission power based on an amount of change in a signal which indicates an amount of light of the light beam reflected from the recording medium.

7. The storage unit as claimed in claim 5, wherein said calculating section calculates an error of successively sampled tracking error signals as the correction quantity.

8. The storage unit as claimed in claim 5, wherein said calculating section calculates the correction quantity by multiplying a constant to an error of successively sampled tracking error signals.

9. The storage unit as claimed in claim 5, wherein said calculating section calculates an average value of a plurality of errors among successively sampled tracking error signals as the correction quantity.

10. The storage unit as claimed in claim 5, wherein said calculating section calculates, as the correction quantity, an average value of a plurality of multiplication results which are obtained by multiplying a constant to a plurality of errors among successively sampled tracking error signals.

11. The storage unit as claimed in claim 5, wherein said calculating section calculates the correction quantity during the tracking control.

12. The storage unit as claimed in claim 5, wherein said calculating section calculates the correction quantity for every write/eras process.

13. A storage unit comprising:

a light source emitting a light beam;

a tracking control section carrying out a tracking control based on a tracking control based an a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power; and a correcting section carrying out a correction by adding the correction quantity to the tracking error signal when the change in the light emission power is detected by said detecting section, wherein said detecting section detects the change in the light emission power based on a write gate signal which indicates a start and an end of a write/erase process with respect to the recording medium.

14. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power; and a correcting section carrying out a correction by adding the correction quantity to the tracking error signal when the change in the light emission power is detected by said detecting section, wherein said detecting section detects the change in the light emission power based on a write gate signal which indicates a start and an end of a write erase process with respect to the recording medium, and an amount of change in a signal which indicates an amount of light of the light beam reflected from the recording medium.

15. A storage unit comprising:

a light source emitting a light beam;

a tracking control section carrying out a tracking control based on a tracking control based on a tracking error signal which indicates an error of a beam spot formed an a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power; and a correcting section carrying out a correction by adding the correction quantity to the tracking error signal when the change in the light emission power is detected by said detecting section, wherein said calculating section calculates an error between a sampled tracking error signal and a tracking control target value as the correction quantity.

16. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power; and a correcting section carrying out a correction by adding the correction quantity to the tracking error signal when the change in the light emission power is detected by said detecting section, wherein said calculating section calculates the correction quantity by multiplying a constant to an error between a sampled tracking error signal and a tracking control target value.

17. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power; and a correcting section carrying out a correction by adding the correction quantity to the tracking error signal when the change in the light emission power is detected by said detecting section, wherein said calculating section calculates, as the correction quantity, an average value of a plurality of errors between a tacking control target value and sampled tracking error signals.

18. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the fight emission power; and a correcting section carrying out a correction by adding the correction quantity to the tracking error signal when the change in the light emission power is detected by said detecting section, wherein said calculating section calculates, as the correction quantity, an average value of a plurality of multiplication results which are obtained by multiplying a constant to a plurality of errors between a tracking control target value and sampled tracking error signals.

19. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power;

a correcting section carrying out a correction by adding the correction quantity to the tracking error signal when the change in the light emission power is detected by said detecting section; and a storing section storing the correction quantity calculated by said calculating section until an edge of a write gate signal indicating an end of a write/erase process with respect to the recording medium is detected, said write gate signal indicating a start and the end of the write/erase process.

20. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power;

a correcting section carrying out a correction by adding the correction quantity to the tracking error signal when the change in the light emission power is detected by said detecting section, and a storing section storing the correction quantity calculated by said calculating section until an end of a write/erase process with respect to the recording medium is detected, said end of the write/erase process being detected when an amount of change in a signal indicating an amount of light of the light beam reflected from the recording medium exceeds a predetermined value.

21. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in light emission power;

a correcting section carrying out a correction by adding the correction quantity to the tracking error signal when the change in the light emission power is detected by said detecting section, and a storing section storing the correction quantity calculated by said calculating section until an edge signal indicating whether a tracking position on the recording medium is a magneto-optical part or an identification part is detected.

22. A storage unit comprising:

a light source emitting a light beam;

a tracking control section carrying out a tacking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power;

a correcting section carrying out a correction by adding the correction quantity to the tracking error signal when the change in the light emission power is detected by said detecting section, and a storing section storing the correction quantity calculated by said calculating section until a number of samples of the tracking error signal becomes a certain value.

23. The storage unit as claimed in claim 22, which further comprises:

a correction quantity control section gradually reducing the correction quantity held by said storing section when the number of samples of the tracking error signal becomes the certain value.

24. A storage unit comprising:

a light source emitting a light beam;

a tracking control section carrying out a tracking control based on a tracking control based on a tracking error signal which indicates an error of a beam spot formed on a recording medium by the light beam with respect to a track;

a detecting section detecting a change in a light emission power of the light source;

a calculating section calculating a correction quantity which is used to correct a shift and/or fluctuation of the tracking error signal generated due to the change in the light emission power;

a correcting section carrying out a correction by adding the correction quantity to the tracking error signal when the change in the light emission power is detected by said detecting section, and a correction quantity control section invalidating correction quantity calculated by said calculating section when the correction quantity is less than or equal to a specific value.

* * * * *